US012659609B2

(12) United States Patent
Mohajerani et al.

(10) Patent No.: US 12,659,609 B2
(45) Date of Patent: Jun. 16, 2026

(54) SOLID-STATE IMAGING DEVICE AND METHOD FOR OPERATING A SOLID-STATE IMAGING DEVICE

(71) Applicant: Sony Semiconductor Solutions Corporation, Atsugi (JP)

(72) Inventors: Mojdeh Mohajerani, Stuttgart (DE); Christian Peter Brändli, Stuttgart (DE); Yuri Kato, Stuttgart (DE)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 129 days.

(21) Appl. No.: 18/283,462

(22) PCT Filed: Mar. 24, 2022

(86) PCT No.: PCT/EP2022/057828
§ 371 (c)(1),
(2) Date: Sep. 22, 2023

(87) PCT Pub. No.: WO2022/207466
PCT Pub. Date: Oct. 6, 2022

(65) Prior Publication Data
US 2024/0171872 A1 May 23, 2024

(30) Foreign Application Priority Data
Mar. 30, 2021 (EP) ..................................... 21165808

(51) Int. Cl.
*H04N 25/47* (2023.01)
*H04N 25/60* (2023.01)
*H04N 25/78* (2023.01)

(52) U.S. Cl.
CPC ............. *H04N 25/47* (2023.01); *H04N 25/60* (2023.01); *H04N 25/78* (2023.01)

(58) Field of Classification Search
CPC ........ H04N 25/47; H04N 25/60; H04N 25/78; H04N 25/707
See application file for complete search history.

(56) References Cited

U.S. PATENT DOCUMENTS

2012/0257789 A1* 10/2012 Lee .......................... G06F 3/017
382/103
2016/0078321 A1 3/2016 Wang et al.
(Continued)

FOREIGN PATENT DOCUMENTS

EP 3518529 A1 7/2019
JP 2020-127186 A 8/2020
(Continued)

OTHER PUBLICATIONS

International Search Report and Written Opinion mailed on Jun. 17, 2022, received for PCT Application PCT/EP2022/057828, filed on Mar. 24, 2022, 10 pages.
Maqueda et al., "Event-based Vision meets Deep Learning on Steering Prediction for Self-driving Cars", IEEE Conference on Computer Vision and Pattern Recognition (CVPR), Available Online at: http://rpg.ifi.uzh.ch/docs/CVPR18_Maqueda.pdf, 2018, 9 pages.
Khan et al., "Time Aggregation based Lossless Video Encoding for Neuromorphic Vision Sensor Data", IEEE Internet of Things Journal, Available Online at: https://eprints.kingston.ac.uk/id/eprint/45886/6/Khan-N-45886-AAM.pdf, Feb. 11, 2020, 15 pages.
(Continued)

*Primary Examiner* — Sinh Tran
*Assistant Examiner* — Angel L Garces-Rivera
(74) *Attorney, Agent, or Firm* — XSENSUS LLP

(57) ABSTRACT
A solid state imaging device comprises a pixel array that comprises a plurality of imaging pixels, each of which being capable to generate an imaging signal depending on the intensity of light falling on the imaging pixel, and to detect as an event a positive or negative change of light intensity that is larger than a respective predetermined threshold, and a control unit that is configured to count the number of events occurring within at least one group of imaging pixels and to read out the imaging signals of the imaging pixels within one of the groups, if the according counted number of events is larger than or equal to a predetermined readout threshold.

20 Claims, 20 Drawing Sheets

(56) References Cited

U.S. PATENT DOCUMENTS

| | | | |
|---|---|---|---|
| 2018/0039601 A1 | 2/2018 | Park et al. | |
| 2020/0410272 A1* | 12/2020 | Seo ..................... | G06V 10/147 |
| 2021/0152757 A1 | 5/2021 | Wakabayashi | |

FOREIGN PATENT DOCUMENTS

| | | |
|---|---|---|
| WO | 2019/145516 A1 | 8/2019 |
| WO | WO-2020071068 A1 | 4/2020 |
| WO | 2020/101892 A1 | 5/2020 |
| WO | 2020/116185 A1 | 6/2020 |
| WO | 2020/120782 A1 | 6/2020 |

OTHER PUBLICATIONS

Cannici et al., "Asynchronous Convolutional Networks for Object Detection in Neuromorphic Cameras", Conference on Computer Vision and Pattern Recognition (CVPR) Workshops, Available Online at: https://openaccess.thecvf.com/content_CVPRW_2019/papers/EventVision/, 2019, 10 pages.
Cohen et al., "Spatial and Temporal Downsampling in Event-Based Visual Classification", IEEE Transactions on Neural Networks and Learning Systems, vol. 29, No. 10, Oct. 2018, pp. 5030-5044.

* cited by examiner

IMAGE SENSOR ASSEMBLY

Cnt    Cnt    Cnt

| 0 | 1 | . | . | . | . | 1 | 1 |

SOLID-STATE IMAGING DEVICE AND METHOD FOR OPERATING A SOLID-STATE IMAGING DEVICE

CROSS-REFERENCE TO RELATED APPLICATIONS

The present application is based on PCT filing PCT/EP2022/057828, filed Mar. 24, 2022, which claims priority from European Patent Application No. 21165808.3, filed Mar. 30, 2021, the entire contents of each are incorporated herein by reference.

FIELD OF THE INVENTION

The present disclosure relates to a solid-state imaging device and a method for operating the same. In particular, the present disclosure is related to the field of event detection sensors reacting to changes in light intensity, such as dynamic vision sensors (DVS).

BACKGROUND

Computer vision deals with how machines and computers can gain high-level understanding from digital images or videos. Typically, computer vision methods aim at excerpting, from raw image data obtained through an image sensor, that type of information the machine or computer uses for other tasks.

Many applications such as machine control, process monitoring or surveillance tasks are based on the evaluation of the movement of objects in the imaged scene. Conventional image sensors with a plurality of pixels arranged in an array of pixels deliver a sequence of still images (frames). Detecting moving objects in the sequence of frames typically involves elaborate and expensive image processing methods.

Event detection sensors like DVS tackle the problem of motion detection by delivering only information about the position of changes in the imaged scene. Unlike image sensors that transfer large amounts of image information in frames, transfer of information about pixels that do not change may be omitted, resulting in a sort of in-pixel data compression. The in-pixel data compression removes data redundancy and facilitates high temporal resolution, low latency, low power consumption, and high dynamic range with little motion blur. DVS are thus well suited especially for solar or battery powered compressive sensing or for mobile machine vision applications where the motion of the system including the image sensor has to be estimated and where processing power is limited due to limited battery capacity. In principle the architecture of DVS allows for high dynamic range and good low-light performance.

It is desirable to utilize and pushing further the inherent high dynamic range, high temporal resolution and good low-light performance of photoreceptor modules, image sensors adapted for event detection like DVS.

SUMMARY OF INVENTION

While event detection provides the above mentioned advantages, an event does not carry a lot of information, but needs to be set into a context by processing a group of events. To this end, an aggregation of reading out full intensity signals and event detection can be used to detect areas in each full intensity frame, in which changes did occur. However, this might cause unnecessary overhead of power consumption and bandwidth usage.

The present disclosure mitigates shortcomings of conventional aggregation of full intensity signal read out and event detection.

To this end, a solid state imaging device is provided that comprises a pixel array comprising a plurality of imaging pixels, each of which being capable to generate an imaging signal depending on the intensity of light falling on the pixel, and to detect as an event a positive or negative change of light intensity that is larger than a respective predetermined threshold, and a control unit that is configured to count the number of events occurring within at least one group of imaging pixels, and to read out the imaging signals of the imaging pixels within one of the groups, if the according counted number of events is larger than or equal to a predetermined readout threshold.

Further, a method is provided for operating a solid state imaging device that comprises a pixel array that comprises a plurality of imaging pixels, each of which being capable to generate an imaging signal depending on the intensity of light falling on the imaging pixel and to detect as an event a positive or negative change of light intensity that is larger than a respective predetermined threshold, wherein the method comprises counting the number of events occurring within at least one group of imaging pixels; and reading out the imaging signals of the imaging pixels within one of the groups, if the according counted number of events is larger than or equal to a predetermined readout threshold.

Full intensity frames are thereby separated into groups of imaging pixels that are only read out, when a sufficiently large number of events has been counted. In this manner it is ensured that only intensity imaging signals are processed that belong to areas of the frame in which changes of the captured scene did take place. Thereby, processing of redundant imaging signals can be omitted, which leads to a reduction of power consumption and bandwidth usage. Thereby, longer battery duration or the possibility for usage of smaller batteries for powering the solid state imaging device can be achieved. Also, benefits of event detection systems like DVSs, such as increased temporal resolution, can be transferred to the readout of intensity imaging signals.

BRIEF DESCRIPTION OF THE DRAWINGS

FIG. 1B is a simplified block diagram of the pixel array illustrated in FIG. 1A.

FIG. 1C is a simplified block diagram of the imaging signal read-out circuitry of the solid state imaging device of FIG. 1A.

FIG. 11 is a simplified block diagram of a data acquisition unit for obtaining position data of events.

FIGS. 12A and 12B are simplified block diagrams of event count circuitry.

DETAILED DESCRIPTION

Figure 1A:
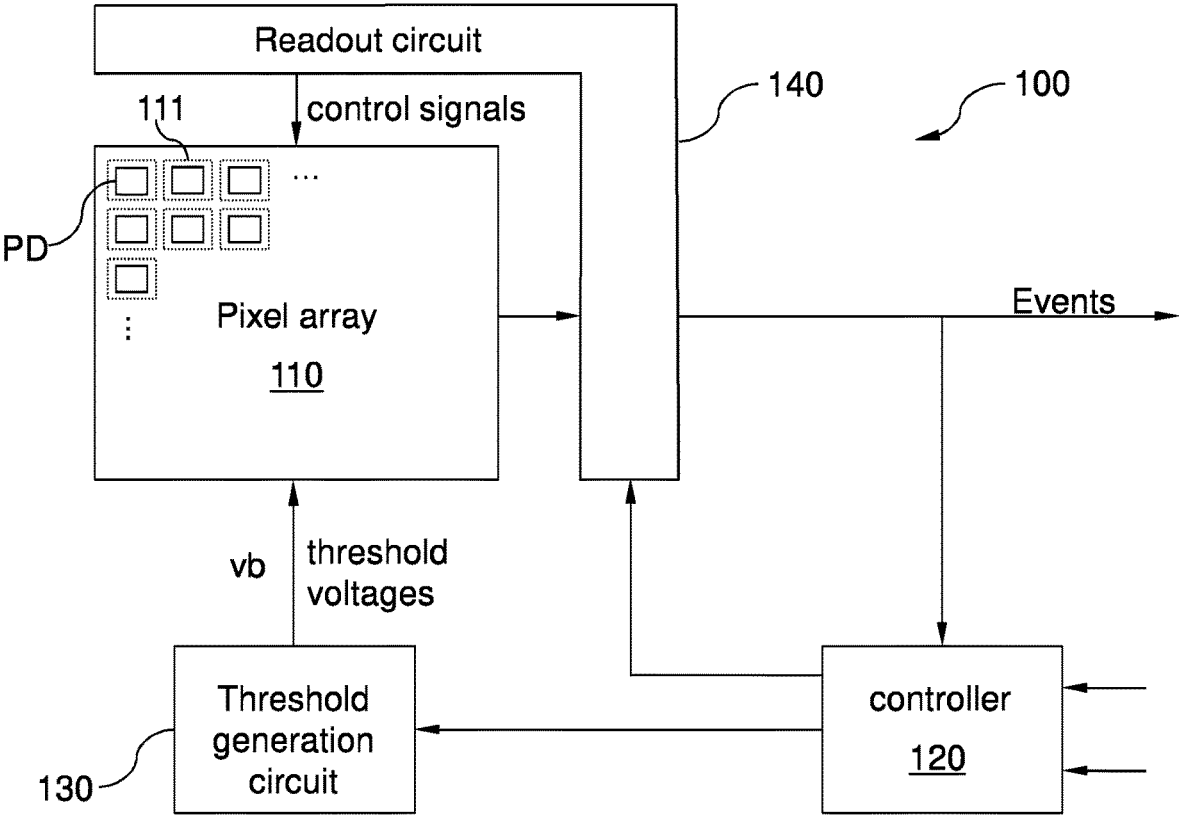
FIG. 1A is a simplified block diagram of the event detection circuitry of a solid-state imaging device including a pixel array.

FIG. 1A is a block diagram of a solid-state imaging device 100 employing event based change detection. The solid-state imaging device 100 includes a pixel array 110 with one or more imaging pixels 111, wherein each pixel 111 includes a photoelectric conversion element PD. The pixel array 110 may be a one-dimensional pixel array with the photoelectric conversion elements PD of all pixels arranged along a straight or meandering line (line sensor). In particular, the pixel array 110 may be a two-dimensional array, wherein the photoelectric conversion elements PDs of the pixels 111 may be arranged along straight or meandering rows and along straight or meandering lines.

The illustrated embodiment shows a two dimensional array of pixels 111, wherein the pixels 111 are arranged along straight rows and along straight columns running orthogonal the rows. Each pixel 111 converts incoming light into an imaging signal representing the incoming light intensity and an event signal indicating a change of the light intensity. e.g. an increase by at least an upper threshold amount and/or a decrease by at least a lower threshold amount. If necessary, the function of each pixel 111 regarding intensity and event detection may be divided and different pixels observing the same solid angle can implement the respective functions. These different pixels may be subpixels and can be implemented such that they share part of the circuitry. The different pixels may also be part of different image sensors. For the present disclosure, whenever it is referred to a pixel capable of generating an imaging signal and an event signal, this should be understood to include also a combination of pixels separately carrying out these functions as described above.

A controller 120 performs a flow control of the processes in the pixel array 110. For example, the controller 120 may control a threshold generation circuit 130 that determines and supplies thresholds to individual pixels 111 in the pixel array 110. A readout circuit 140) provides control signals for addressing individual pixels 111 and outputs information about the position of such pixels 111 that indicate an event. Since the solid-state imaging device 100 employs event-based change detection, the readout circuit 140) may output a variable amount of data per time unit.

Figure 1B:
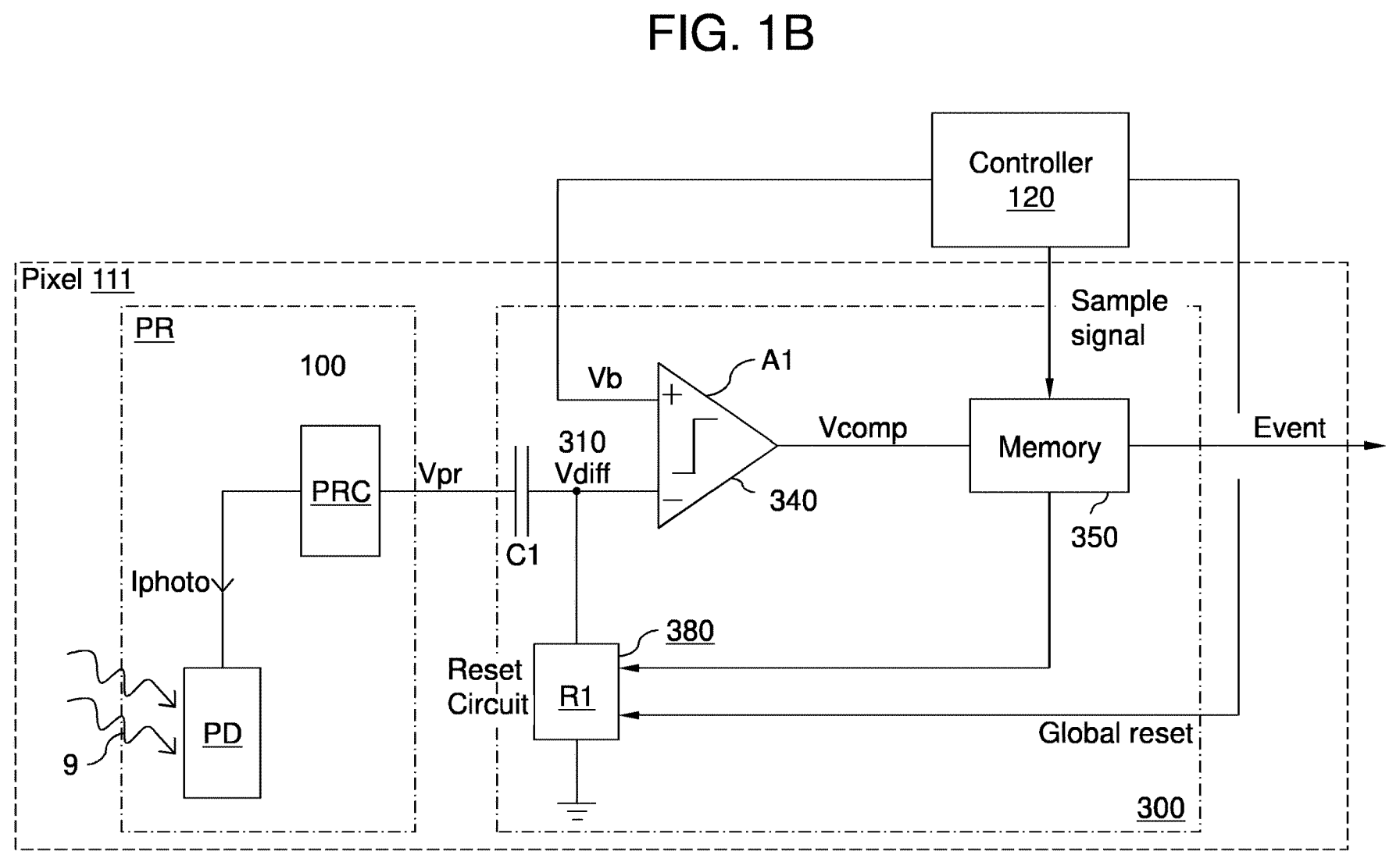

FIG. 1B shows exemplarily details of the imaging pixels 111 in FIG. 1A as far as their event detection capabilities are concerned. Of course, any other implementation that allows detection of events can be employed. Each pixel 111 includes a photoreceptor module PR and is assigned to a pixel back-end 300, wherein each complete pixel back-end 300 may be assigned to one single photoreceptor module PR. Alternatively, a pixel back-end 300 or parts thereof may be assigned to two or more photoreceptor modules PR, wherein the shared portion of the pixel back-end 300 may be sequentially connected to the assigned photoreceptor modules PR in a multiplexed manner.

The photoreceptor module PR includes a photoelectric conversion element PD. e.g. a photodiode or another type of photosensor. The photoelectric conversion element PD converts impinging light 9 into a photocurrent Iphoto through the photoelectric conversion element PD, wherein the amount of the photocurrent Iphoto is a function of the light intensity of the impinging light 9.

A photoreceptor circuit PRC converts the photocurrent Iphoto into a photoreceptor signal Vpr. The voltage of the photoreceptor signal Vpr is a function of the photocurrent Iphoto.

A memory capacitor 310 stores electric charge and holds a memory voltage which amount depends on a past photoreceptor signal Vpr. In particular, the memory capacitor 310 receives the photoreceptor signal Vpr such that a first electrode of the memory capacitor 310 carries a charge that is responsive to the photoreceptor signal Vpr and thus the light received by the photoelectric conversion element PD. A second electrode of the memory capacitor C1 is connected to the comparator node (inverting input) of a comparator circuit 340. Thus the voltage of the comparator node. Vdiff varies with changes in the photoreceptor signal Vpr.

The comparator circuit 340 compares the difference between the current photoreceptor signal Vpr and the past photoreceptor signal to a threshold. The comparator circuit 340 can be in each pixel back-end 300, or shared between a subset (for example a column) of pixels. According to an example each pixel 111 includes a pixel back-end 300 including a comparator circuit 340, such that the comparator circuit 340 is integral to the imaging pixel 111 and each imaging pixel 111 has a dedicated comparator circuit 340.

A memory element 350 stores the comparator output in response to a sample signal from the controller 120. The memory element 350 may include a sampling circuit (for example a switch and a parasitic or explicit capacitor) and/or a digital memory circuit such as a latch or a flip-flop). In one embodiment, the memory element 350 may be a sampling circuit. The memory element 350 may be configured to store one, two or more binary bits.

An output signal of a reset circuit 380 may set the inverting input of the comparator circuit 340 to a predefined potential. The output signal of the reset circuit 380 may be controlled in response to the content of the memory element 350 and/or in response to a global reset signal received from the controller 120.

The solid-state imaging device 100 is operated as follows: A change in light intensity of incident radiation 9 translates into a change of the photoreceptor signal Vpr. At times designated by the controller 120, the comparator circuit 340 compares Vdiff at the inverting input (comparator node) to a threshold Vb applied on its non-inverting input. At the same time, the controller 120 operates the memory element 350 to store the comparator output signal Vcomp. The memory element 350 may be located in either the pixel circuit 111 or in the readout circuit 140 shown in FIG. 1A.

If the state of the stored comparator output signal indicates a change in light intensity AND the global reset signal GlobalReset (controlled by the controller 120) is active, the conditional reset circuit 380 outputs a reset output signal that resets Vdiff to a known level.

The memory element 350 may include information indicating a change of the light intensity detected by the pixel 111 by more than a threshold value.

The solid state imaging device 120 may output the addresses (where the address of a pixel 111 corresponds to its row and column number) of those pixels 111 where a light intensity change has been detected. A detected light intensity change at a given pixel is called an event. More specifically, the term 'event' means that the photoreceptor signal representing and being a function of light intensity of a pixel has changed by an amount greater than or equal to a threshold applied by the controller through the threshold generation circuit 130. To transmit an event, the address of the corresponding pixel 111 is transmitted along with data indicating whether the light intensity change was positive or negative. The data indicating whether the light intensity change was positive or negative may include one single bit.

To detect light intensity changes between current and previous instances in time, each pixel 111 stores a representation of the light intensity at the previous instance in time.

More concretely, each pixel 111 stores a voltage Vdiff representing the difference between the photoreceptor signal at the time of the last event registered at the concerned pixel 111 and the current photoreceptor signal at this pixel 111.

To detect events. Vdiff at the comparator node may be first compared to a first threshold to detect an increase in light intensity (ON-event), and the comparator output is sampled on a (explicit or parasitic) capacitor or stored in a flip-flop. Then Vdiff at the comparator node is compared to a second threshold to detect a decrease in light intensity (OFF-event) and the comparator output is sampled on a (explicit or parasitic) capacitor or stored in a flip-flop.

The global reset signal is sent to all pixels 111, and in each pixel 111 this global reset signal is logically ANDed with the sampled comparator outputs to reset only those pixels where an event has been detected. Then the sampled comparator output voltages are read out, and the corresponding pixel addresses sent to a data receiving device.

Figure 1C:
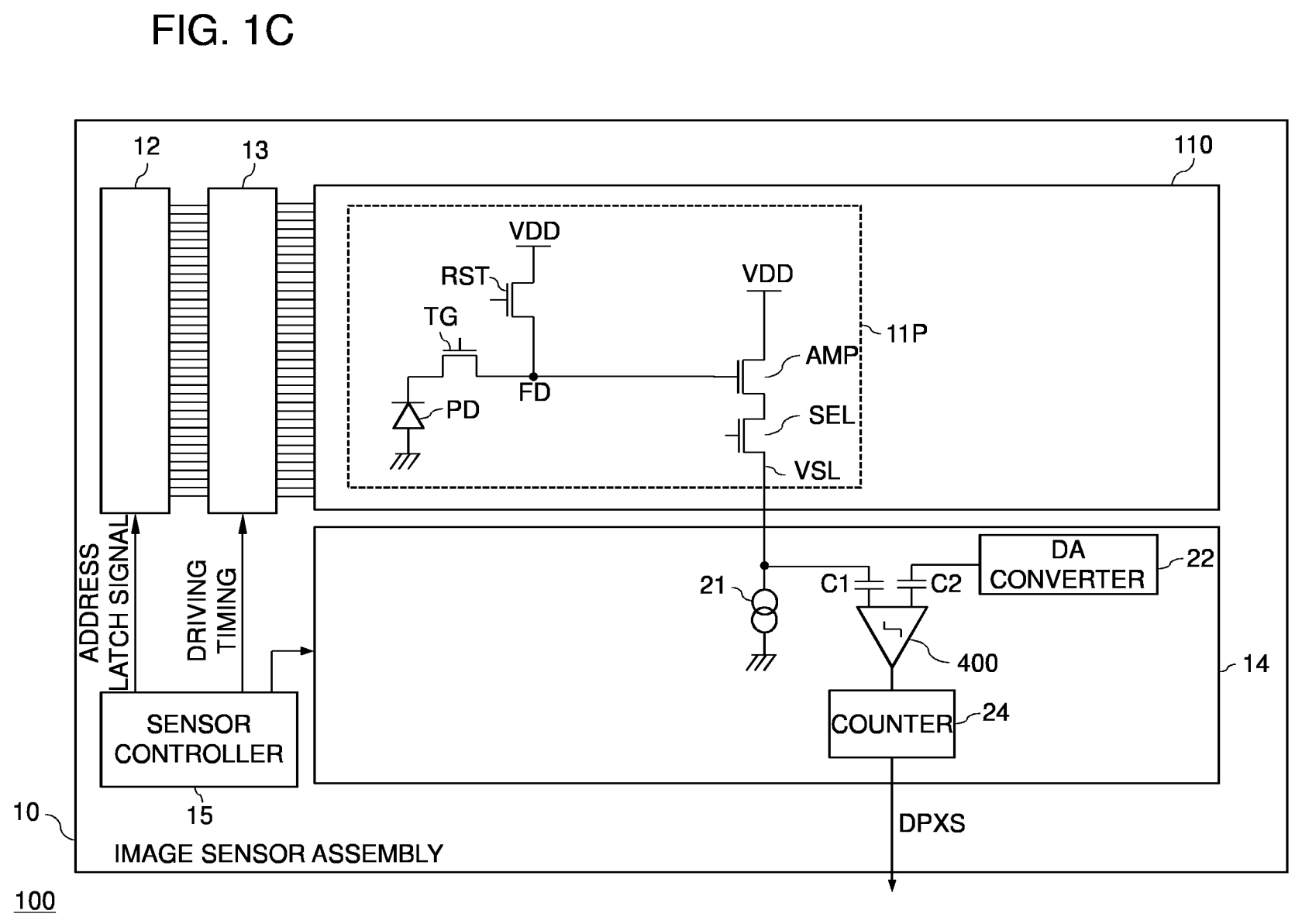

FIG. 1C illustrates a configuration example of the solid-state imaging device 100 including an image sensor assembly 10 that is used for readout of intensity imaging signals in form of an active pixel sensor. APS. Here. FIG. 1C is purely exemplary. Readout of imaging signals can also be implemented in any other known manner. As stated above, the image sensor assembly 10 may use the same pixels 111 or may supplement these pixels 111 with additional pixels observing the respective same solid angles. In the following description the exemplary case of usage of the same pixel array 110 is chosen.

The image sensor assembly 10 includes the pixel array 110, an address decoder 12, a pixel timing driving unit 13, an ADC (analog-to-digital converter) 14, and a sensor controller 15.

The pixel array 110 includes a plurality of pixel circuits 11P arranged matrix-like in rows and columns. Each pixel circuit 11P includes a photosensitive element and FETs (field effect transistors) for controlling the signal output by the photosensitive element.

The address decoder 12 and the pixel timing driving unit 13 control driving of each pixel circuit 11P disposed in the pixel array 110. That is, the address decoder 12 supplies a control signal for designating the pixel circuit 11P to be driven or the like to the pixel timing driving unit 13 according to an address, a latch signal, and the like supplied from the sensor controller 15. The pixel timing driving unit 13 drives the FETs of the pixel circuit 11P according to driving timing signals supplied from the sensor controller 15 and the control signal supplied from the address decoder 12. The electric signals of the pixel circuits 11P (pixel output signals, imaging signals) are supplied through vertical signal lines VSL to ADCs 14, wherein each ADC 14 is connected to one of the vertical signal lines VSL, and wherein each vertical signal line VSL is connected to all pixel circuits 11P of one column of the pixel array unit 11. Each ADC 14 performs an analog-to-digital conversion on the pixel output signals successively output from the column of the pixel array unit 11 and outputs the digital pixel data DPXS to the signal processing unit 19. To this purpose, each ADC 14 includes a comparator 23, a digital-to-analog converter (DAC) 22 and a counter 24.

The sensor controller 15 controls the image sensor assembly 10. That is, for example, the sensor controller 15 supplies the address and the latch signal to the address decoder 12, and supplies the driving timing signal to the pixel timing driving unit 13. In addition, the sensor controller 15 may supply a control signal for controlling the ADC 14.

The pixel circuit 11P includes the photoelectric conversion element PD as the photosensitive element. The photoelectric conversion element PD may include or may be composed of, for example, a photodiode. With respect to one photoelectric conversion element PD, the pixel circuit 11P may have four FETs serving as active elements, i.e., a transfer transistor TG, a reset transistor RST, an amplification transistor AMP, and a selection transistor SEL.

The photoelectric conversion element PD photoelectrically converts incident light into electric charges (here, electrons). The amount of electric charge generated in the photoelectric conversion element PD corresponds to the amount of the incident light.

The transfer transistor TG is connected between the photoelectric conversion element PD and a floating diffusion region FD. The transfer transistor TG serves as a transfer element for transferring charge from the photoelectric conversion element PD to the floating diffusion region FD. The floating diffusion region FD serves as temporary local charge storage. A transfer signal serving as a control signal is supplied to the gate (transfer gate) of the transfer transistor TG through a transfer control line.

Thus, the transfer transistor TG may transfer electrons photoelectrically converted by the photoelectric conversion element PD to the floating diffusion FD.

The reset transistor RST is connected between the floating diffusion FD and a power supply line to which a positive supply voltage VDD is supplied. A reset signal serving as a control signal is supplied to the gate of the reset transistor RST through a reset control line.

Thus, the reset transistor RST serving as a reset element resets a potential of the floating diffusion FD to that of the power supply line.

The floating diffusion FD is connected to the gate of the amplification transistor AMP serving as an amplification element. That is, the floating diffusion FD functions as the input node of the amplification transistor AMP serving as an amplification element.

The amplification transistor AMP and the selection transistor SEL are connected in series between the power supply line VDD and a vertical signal line VSL.

Thus, the amplification transistor AMP is connected to the signal line VSL through the selection transistor SEL and constitutes a source-follower circuit with a constant current source 21 illustrated as part of the ADC 14.

Then, a selection signal serving as a control signal corresponding to an address signal is supplied to the gate of the selection transistor SEL through a selection control line, and the selection transistor SEL is turned on.

When the selection transistor SEL is turned on, the amplification transistor AMP amplifies the potential of the floating diffusion FD and outputs a voltage corresponding to the potential of the floating diffusion FD to the signal line VSL. The signal line VSL transfers the pixel output signal from the pixel circuit 11P to the ADC 14.

Since the respective gates of the transfer transistor TG, the reset transistor RST, and the selection transistor SEL are, for example, connected in units of rows, these operations are simultaneously performed for each of the pixel circuits 11P of one row. Further, it is also possible to selectively read out single pixels or pixel groups.

The ADC 14 may include a DAC 22, the constant current source 21 connected to the vertical signal line VSL, a comparator 23, and a counter 24.

The vertical signal line VSL, the constant current source 21 and the amplifier transistor AMP of the pixel circuit 11P combine to a source follower circuit.

The DAC 22 generates and outputs a reference signal. By performing digital-to-analog conversion of a digital signal increased in regular intervals. e.g. by one, the DAC 22 may generate a reference signal including a reference voltage ramp. Within the voltage ramp, the reference signal steadily increases per time unit. The increase may be linear or not linear.

The comparator 23 has two input terminals. The reference signal output from the DAC 22 is supplied to a first input terminal of the comparator 23 through a first capacitor C1. The pixel output signal transmitted through the vertical signal line VSL is supplied to the second input terminal of the comparator 23 through a second capacitor C2.

The comparator 23 compares the pixel output signal and the reference signal that are supplied to the two input terminals with each other, and outputs a comparator output signal representing the comparison result. That is, the comparator 23 outputs the comparator output signal representing the magnitude relationship between the pixel output signal and the reference signal. For example, the comparator output signal may have high level when the pixel output signal is higher than the reference signal and may have low level otherwise, or vice versa. The comparator output signal VCO is supplied to the counter 24.

The counter 24 counts a count value in synchronization with a predetermined clock. That is, the counter 24 starts the count of the count value from the start of a P phase or a D phase when the DAC 22 starts to decrease the reference signal, and counts the count value until the magnitude relationship between the pixel output signal and the reference signal changes and the comparator output signal is inverted. When the comparator output signal is inverted, the counter 24 stops the count of the count value and outputs the count value at that time as the AD conversion result (digital pixel data DPXS) of the pixel output signal.

The above described structures can be used in a combined manner to reduce overheads in the readout of intensity imaging signals by referring to event data obtained from event detection. The top level structure of the solid state imaging device 100 for such a combined use is schematically illustrated in FIG. 2.

Figure 2:
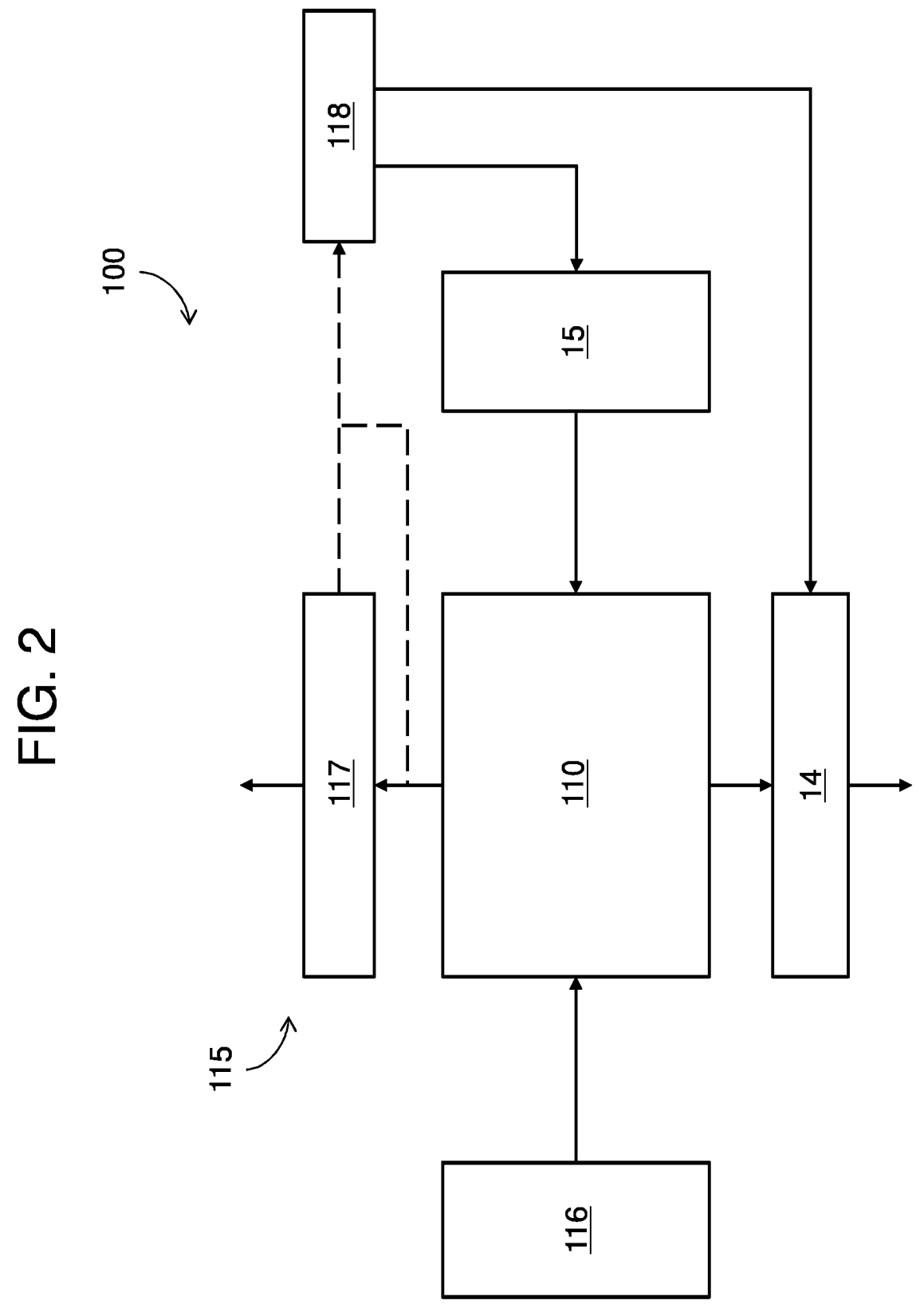
FIG. 2 is another simplified block diagram of the solid-state-imaging device of FIGS. 1A to 1C.

As illustrated in FIG. 2 the solid state imaging device 100 comprises the pixel array 110 and a control unit 115 carrying out all control and processing functions of the solid state imaging device 100. In particular, all elements of the solid state imaging device 100 shown in FIG. 2 other than the pixel array 110 are part of the control unit 115. The control unit 115 is not necessarily a single element like a chip, circuitry or a processor, but may be constituted by several according hardware elements and/or by software functions. Also the separation into different elements as illustrated in FIG. 2 is merely exemplary. The control unit 115 may have any structure as long as it is capable to carry out the functions described herein.

As described above, the imaging pixels 111 of the pixel array 110 are capable to generate imaging signals depending on the intensity of light falling on the pixels. The control unit 115 is capable to select an order according to which the imaging signals are forwarded to the respective ADCs 14 for readout.

At the same time the control unit 115 is capable to control event detection based on event control data provided from an event control signal generation unit 116 that comprise e.g. the thresholds for determining whether or not an event has occurred as described with respect to the threshold generation circuit 130 of FIG. 1A, which might be part of the event control signal generation unit 116. The events are read out as described e.g. with respect to FIG. 1B by a data acquisition unit 117. From here the detected events may be output for different purposes as illustrated by the upward pointing arrow. Also, events may be filtered in order to remove background activity or flicker effects before being further processed as described below.

In order to use the event data for selection of non-redundant image signals, the control unit 115 counts the number of events and decides thereon which parts of the pixel array 110 are read out. To this end, the control unit 115 groups at least one plurality of imaging pixels 111 into a group and determines how many events have occurred in this group. If a predetermined readout threshold is crossed by the number of events counted for the group, the control unit 115 initiates readout of at least the pixels within this group. e.g. via the circuitry described with respect to FIG. 1C.

Although the pixel array 110 may include only a single group at e.g. an area that is of most interest, it is preferable to divide the entire pixel array 110 into such groups. The groups may be overlapping or non-overlapping. Further, the pixels 111 of the groups may fully cover the pixel array or there may be gaps containing pixels 111 that do not belong to any group. A single group may have any form and be e.g. a N×M pixel matrix. For example, the entire pixel array 110 can be divided into 16×16 pixel groups.

After it has been determined that the readout threshold for a particular group has been crossed, readout of the corresponding pixels 111 is performed. This guarantees that only parts of the entire pixel area are read out in which the captured scene has been changed. i.e. in which new information is available. Thus readout of redundant information can substantially be avoided, leading to a reduction of power consumption and bandwidth use. Instead of full frame readout after predetermined time intervals the pixel array is read out in a patch-wise manner. Thus, in the resulting image only newly readout patches are updated instead of newly drawing the entire image based on the full frame data. Also this leads to a reduction of the processing burden.

Further, by appropriately setting the readout threshold it can be ensured that although using event data for selection of imaging signal readout, groups with only a small amount of changes are not read out. Also, by basing the readout on the transgression of the readout threshold, but not on the number of events during a fixed time interval, it is ensured that readout starts as soon as the changes within one patch have become large enough. Thus, situations can be avoided, in which an event series stretching across two fixed event count periods is found insufficient to trigger readout, thereby preventing loss of information.

An event threshold based patch-wise readout avoids therefore processing of redundant information while ensuring at the same time that no important information is lost.

A possible implementation of this procedure is shown in the right hand part of FIG. 2. As shown by the dashed lines detected events and their position within the pixel array are provided to a smart active pixel trigger unit 118. Therein, the number of events per pixel and/or per group are counted and stored together with position information. Here, either positive polarity events, negative polarity events and/or the sum of events of either polarity are counted and stored. Control signals for readout of imaging pixels belonging to groups for which the readout threshold has been crossed are provided to readout circuitry as e.g. described with respect to FIG. 1C, for example to the sensor controller 15 and the ADC 14. Here, the readout imaging signals are provided with additional address information that allows stitching together an entire frame image from the different read out image patches.

The generation of readout control signals in the smart active pixel trigger unit 118 and the sensor controller 15 may be based on the full row and column address of each of the pixels. However, it is also possible to use a flag representation of the pixel array 110 that indicates the number of events occurred in each of the imaging pixels 111 or in each of the groups with one flag, where there is a one-to-one map between positions of the imaging pixels 111 or the groups in the pixel array 110 and the positions of the indication of the number of events within the flag representation.

Figure 3:
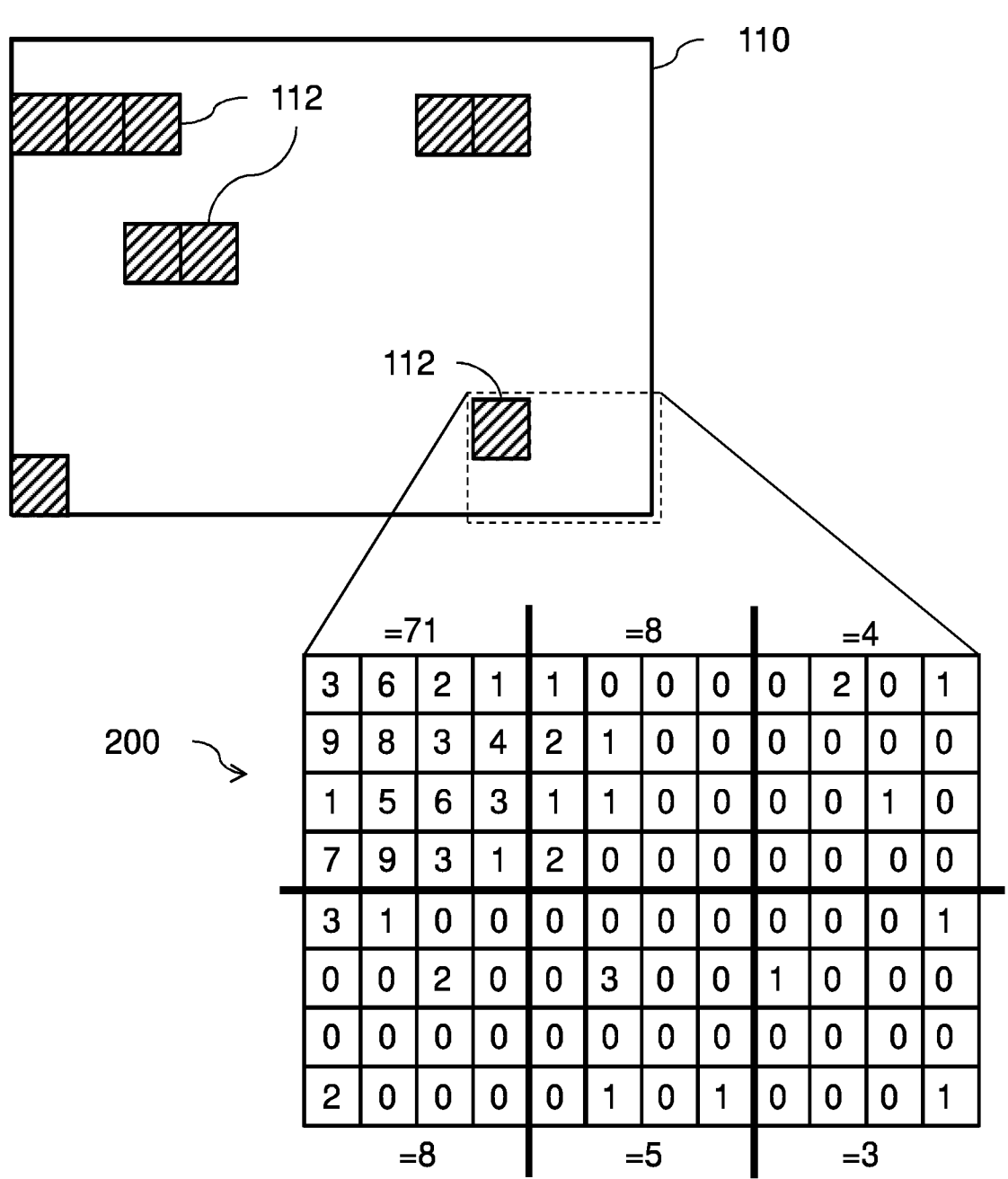
FIG. 3 shows in a simplified manner a result of an event count for a pixel array.

An example of an event count leading to a flag representation 200 is schematically illustrated in FIG. 3. FIG. 3 shows as hatched blocks various groups 112 of pixels 111 within the pixel array 110 for which the readout threshold has been crossed. The six groups in the lower right corner of the pixel array 110 of FIG. 3 contain one such group 112, while in five groups the number of events is below the readout threshold. For these six groups the event count for an event flag representation 200 is shown for one type of polarity. e.g. for positive polarity events or negative polarity events. Of course, it would also be possible to use the number of events of any polarity instead of focusing on only one polarity.

In the example of FIG. 3 each of the groups consist of an array of 4×4 imaging pixels 111. For each of these pixels 111 the number of events that have occurred since a last reset of the event count is stored in a one-to-one map that allows retrieving the position within the pixel array 110 from the storage position. This is represented in FIG. 3 by a matrix of event numbers that correspond exactly to the matrix of imaging pixels 111 forming the groups.

In the example, the events of the upper left group sum up to 71, while the other groups have cumulative event numbers of 8, 4, 8, 5, and 3. Using e.g. a readout threshold of e.g. 10, 20, or 50 only the upper left group crosses the threshold. The corresponding row and column addresses of the pixels 111 within this group can then be simply deduced from the storage positions of the respective event counts. The imaging pixels 111 to be read out at a certain time can therefore be forwarded as a string of "O" and "1", where each "1" indicates that the pixel position corresponding to the location of the "1" in the string has to be read out.

Alternatively, entire group positions may be assigned in the same manner by only referring e.g. to the upper left pixel of a group and to the known group size. Further alternatively, also readout of several consecutive groups may be indicated by referring only to the first group and the number of consecutive groups or by using implicit knowledge about that number, such as e.g. reading out full rows containing one of the groups. Instead of using a representation assigning to each imaging pixel 111 the respective event count, it is also possible to only store the events for the entire groups. In the example of the last six groups of FIG. 3 this would result in entries of 71, 8, 4, 8, 5, and 3 for the respective groups, leading e.g. to a flag string of 1, 0, 0, 0, 0, 0. Again, this allows retrieving the positions of the groups within the pixel array 110.

Of course, any other method of imaging pixel 111 address indication will be possible. For example, if bandwidth allows, also the full row and column address of each pixel to be read out can be forwarded to the sensor controller 15.

Figure 4:
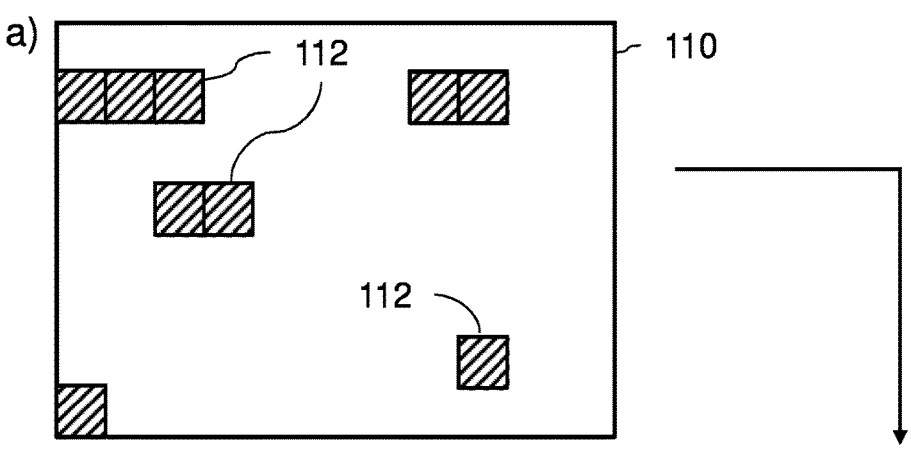
FIG. 4 shows in a simplified manner a selection of imaging pixels for readout.
Figure 4:
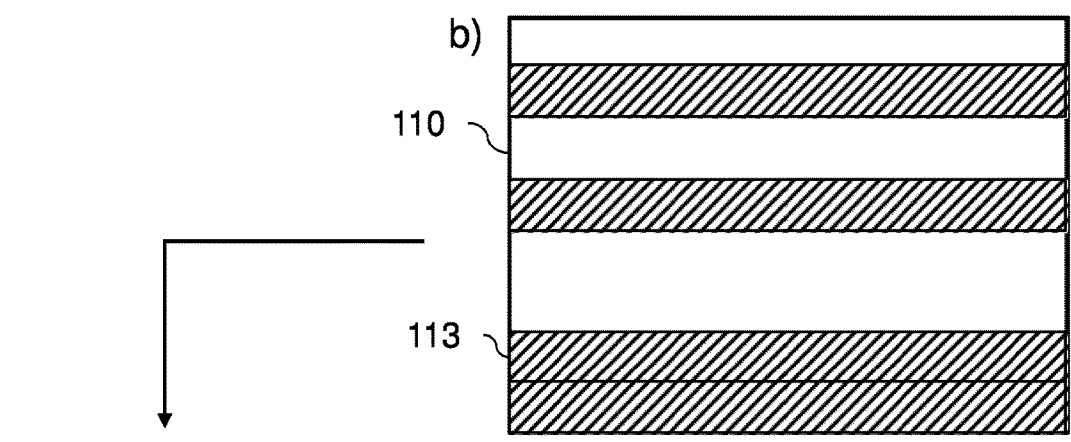
Figure 4:
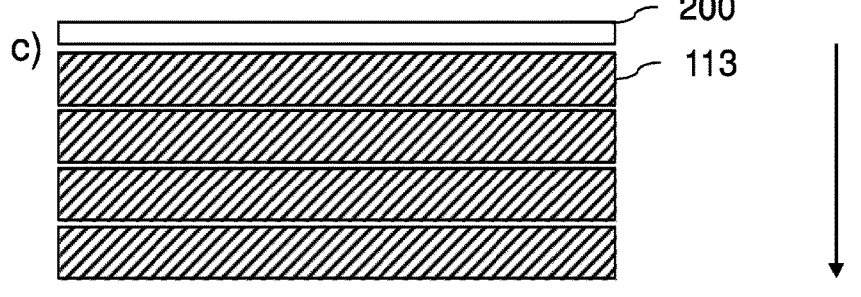
Figure 4:
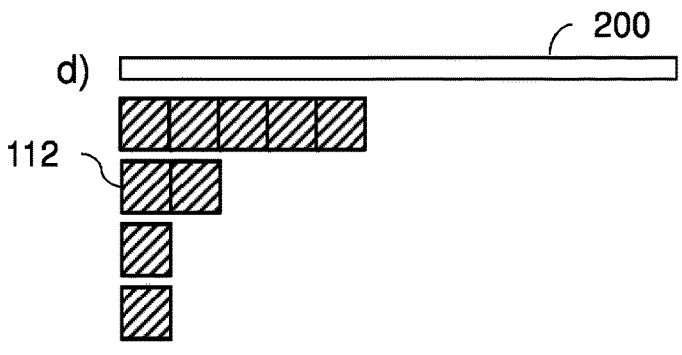

FIG. 4 gives an example for a readout flow. FIG. 4a) shows a number of groups 112 having event counts that lie above the readout threshold. In the example of FIG. 4 further bandwidth reduction is achieved by only forwarding the row addresses of the groups 112 as illustrated schematically in FIG. 4b) that shows the corresponding rows 113 in a hatched manner. Based on these row addresses the imaging signals are read out. Here, it is possible to either read out the full rows 113 as shown in FIG. 4c) or to further select based on the map provided by the flag representation 200 only the imaging pixels of the groups 112 as shown in FIG. 4d). Here, in addition to the imaging signals also the flag representation 200 is output as a first line in order to allow reconstruction of the position of the different following imaging signals in the resulting image frame.

The variant of FIG. 4c) comes with the advantage of having constant line length and therefore a constant amount of data to be processes, which eases image processing. On the other hand, the variant of FIG. 4d) has the advantage that truly only those parts of the pixel array 110 are read out for which the event count has crossed the readout threshold, which leads to an increased reduction of redundancy.

Figure 5A:
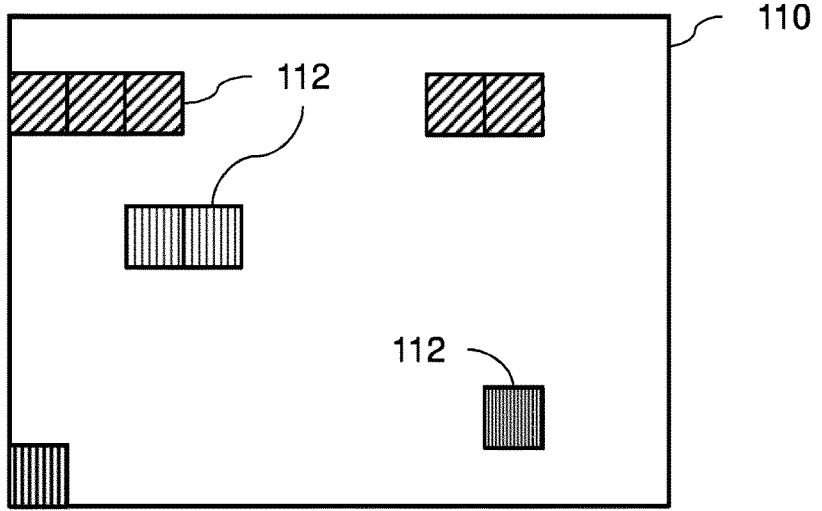
FIGS. 5A to 5C show in a simplified manner a construction of readout frames.
Figure 5B:
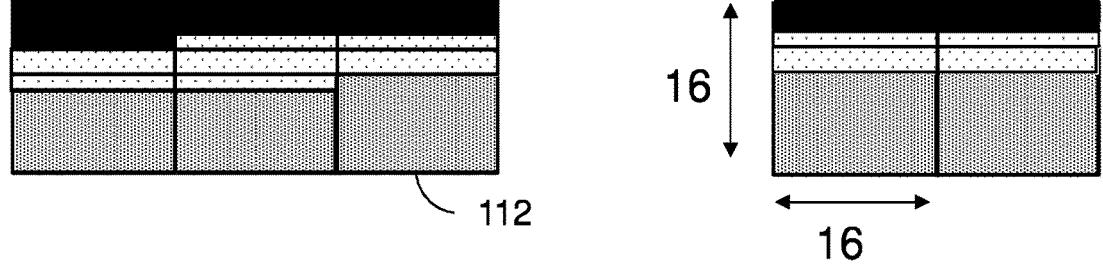
Figure 5C:
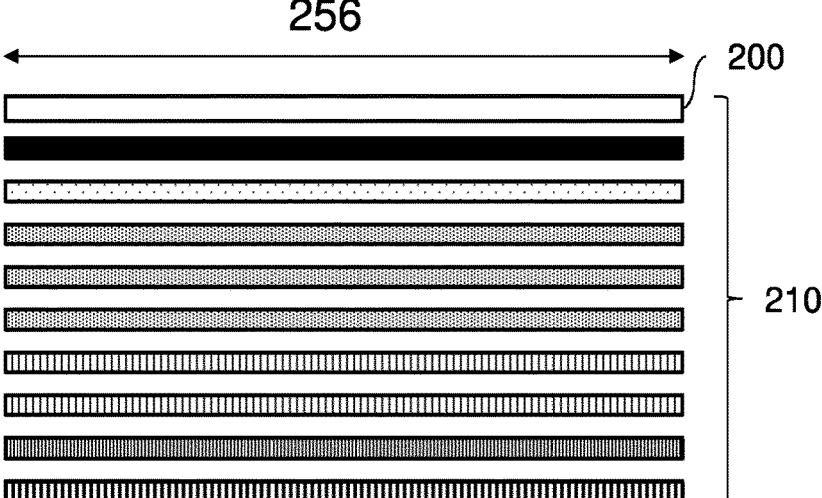

A further example for constructing readout frames with an event count based selection of imaging signals is shown in FIGS. 5A to 5C, in which the two aforementioned advantages are combined. i.e. in which a constant amount of data per line of the readout frame can be achieved while only imaging pixels 111 of groups 112 with event counts above the readout threshold are read.

To this end, the pixel array 110 is divided into groups of equal size, for example into groups of 16×16=256 imaging pixels 111. At the same time the line length of the readout frame is set to the number of imaging pixels 111 in each of the groups. So, for groups of 16×16 pixels. 256 imaging signals will be contained in one line of the readout frame. This allows consecutively filling in the lines of the readout frame in a one-to-one manner with the imaging pixels 111 of the groups 112 that have crossed the readout threshold.

For example. FIG. 5A shows the same groups 112 for readout as FIGS. 3 and 4A. Imaging pixels 111 of these groups 112 are read out in a row by row fashion to create the readout frame 210 as shown in FIG. 5C. Since the pixel number of one group matches the line length of the readout frame 210, one line of the readout frame 210 will be filled after reading out M rows of the groups 112, where M is the number of rows contained in one group. Thus, for groups of a size of 16×16, one line will be filled after 16 rows of the groups 112 are read out.

This is illustrated exemplary in FIGS. 5B and 5C. FIG. 5B shows the first five groups 112 located in the same rows of the pixel array 110 of FIG. 5A. Here, reading out the first three rows of these five groups 112 leads to 15 group rows. Thus, for filling up one line of the readout frame 210, one further row of the leftmost group 112 will be readout. These rows and the corresponding line of the readout frame are illustrated black in FIGS. 5B and 5C.

Next, imaging signals of the next four groups in the same row will be read out, leading to four readout group rows. This is followed by full readout along two rows of all five groups, giving another ten group rows. The remaining two group rows are taken from the two leftmost of the five groups shown in FIG. 5B. This sums up to 16 group rows, i.e. 256 imaging signals fitting in one line of the readout frame 210. Read out rows and the corresponding line is shown in light dotted manner in FIGS. 5B and 5C. The rest of the rows of the five groups 112 of FIG. 5B amounts to 3×1+5×9=48 group rows, leading to the three heavy dotted lines of FIG. 5C. The remaining groups 112 of FIG. 5A fit then into lines of the readout frame as indicated by the hatchings of FIGS. 5A and 5C.

Accordingly, it is possible to read out only those imaging signals that correspond to groups 112 that have event counts at or above the readout threshold, while still keeping a constant data amount per line of the readout frame 210) for easy processing. As explained for FIG. 4 also according to this example a line including the pixel addresses of the imaging signals in the readout frame 210 can be included in the readout frame 210. e.g. by including the flag representation 200 in a first line of the readout frame 210.

Figure 6A:
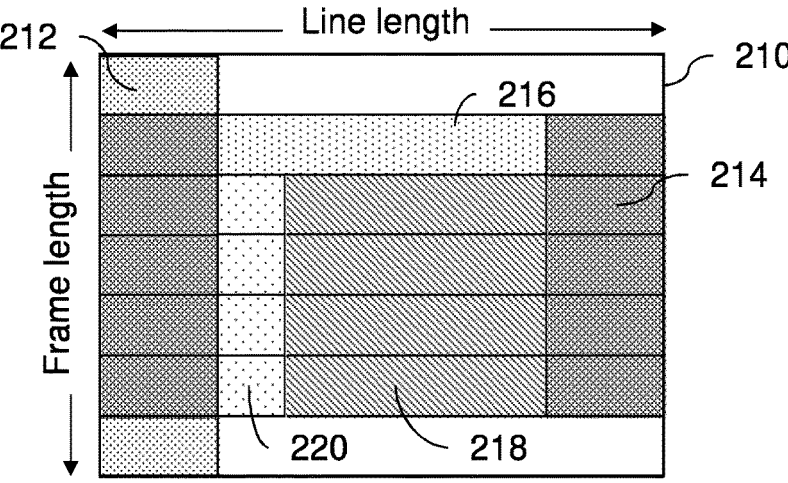
FIGS. 6A to 6C show in a simplified manner another construction of readout frames.
Figure 6B:
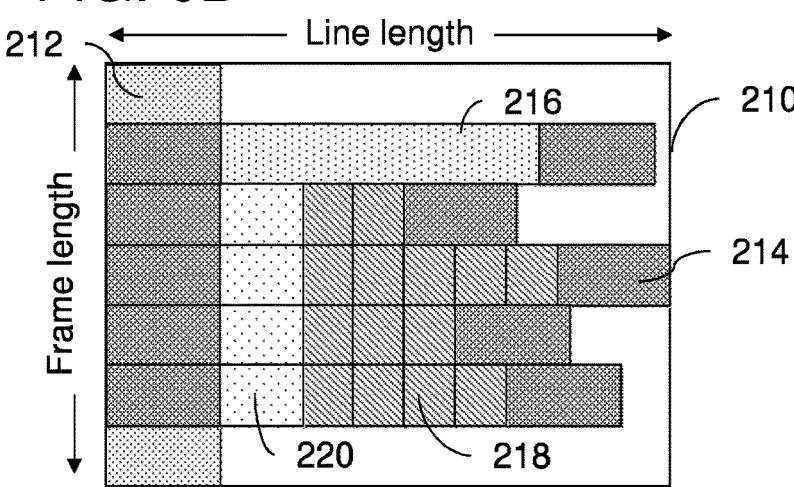
Figure 6C:
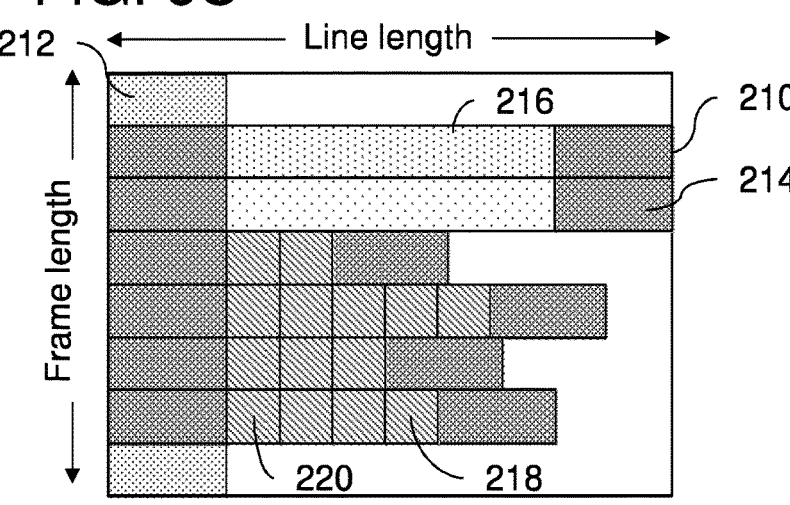

A still different arrangement of imaging signals in readout frames 210 is exemplary shown in FIGS. 6A to 6C. Here, instead of using the flag representation 200 row and column addresses of imaging pixels 111 generating the imaging signals contained in one frame are indicated as additional headers within the readout frame 210. In particular, the readout frame 210) might include frame information 212 indicating frame start and frame end and line information 214 indicating line start and line end as is in principle known to a skilled person. Further, embedded information 216 about the readout frame 210) can be provided. However, address information 220 can be provided in addition to the data 218 contained between the line information 214 or as additional line, which address information 220 contains either the addresses of the imaging signals contained in the same line (FIGS. 6A and 6B), or the addresses of all the imaging signals contained in the readout frame 210 (FIG. 6C). Also here it is possible to use a fixed data length as illustrated in FIG. 6A or to use variable data lengths as shown in FIGS. 6B and 6C. An advantage of using addressing per line is that the line order may be unsorted without additional processing, while for a flag representation 200 or a global indicator of addresses the order of unsorted lines must be mirrored in the global address indication.

In the above described manner readout frames can be generated whenever one or a number of groups 112 has an event count that crosses the readout threshold.

Figure 7A:
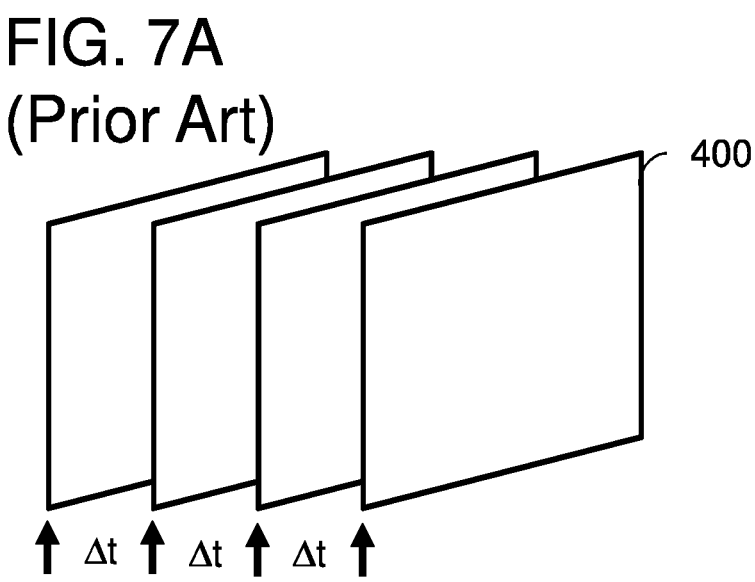
FIGS. 7A and 7B show in a simplified manner a difference of a read-out of imaging signals with respect to the prior art.
Figure 7B:
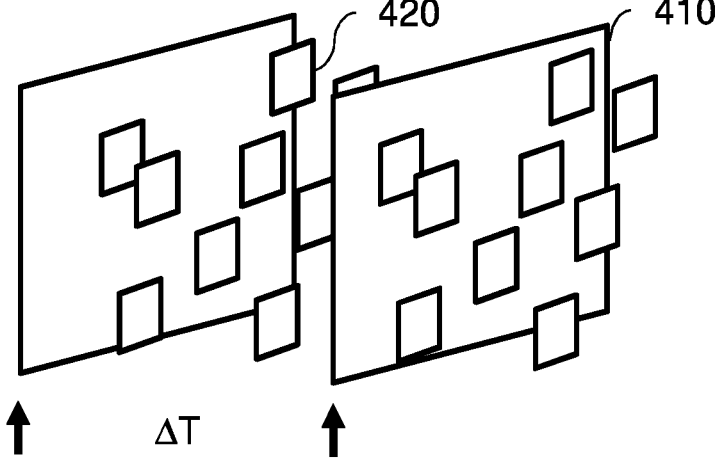

As illustrated schematically in FIGS. 7A and 7B this leads to a large flexibility for reading out pixels of a full imaging frame. In particular, as shown in FIG. 7A according to the prior art full intensity image frames are read out with a predetermined frame rate, i.e. after a predetermined time interval Δt. In contrast, by the above method, image patches are readout whenever something interesting happens at the corresponding part of the captured scene, in particular if there is a moving object in this part of the image. This leads to a patch-wise generation of the intensity image by updating those parts of the intensity image where a sufficient amount of the observed scenery has taken place.

Although this can in principle be performed without the necessity to read out full intensity frames, under given circumstances it might be advantageous to supplement the purely event count based approach with the readout of full intensity frames, i.e. with the readout of all imaging signals of all imaging pixels 111 within the pixel array. However, also in this case a sufficient amount of redundancy reduction can be obtained, as e.g. illustrated in FIG. 7B. Here, all imaging pixels 111 are read out with a predetermined timing. e.g. after a predetermined time interval ΔT.

Additionally imaging signals of imaging pixels 111 within groups 112 for which the counted number of events is larger or equal to the predetermined readout threshold are read out.

Thus, from time to time information about the entire imaging range, i.e. from the entire pixel array 110, is obtained. Additionally, patch-wise information is obtained with a higher frequency to adapt the image information whenever and wherever the captured scene has been changed. In this manner, the time between obtaining full information or base frames that form the basis for image reproduction is filled with patch-wise information or inner frames for updating parts of the image.

Here, it has to be noted that although exemplary illustrated in this manner in FIG. 7B base frames can also be obtained in an interleaved manner with inner frames, i.e. the full pixel information can be obtained in a temporally stretched manner, which has to be understood nevertheless as a predetermined timing in the context of the present disclosure.

Figure 8A:
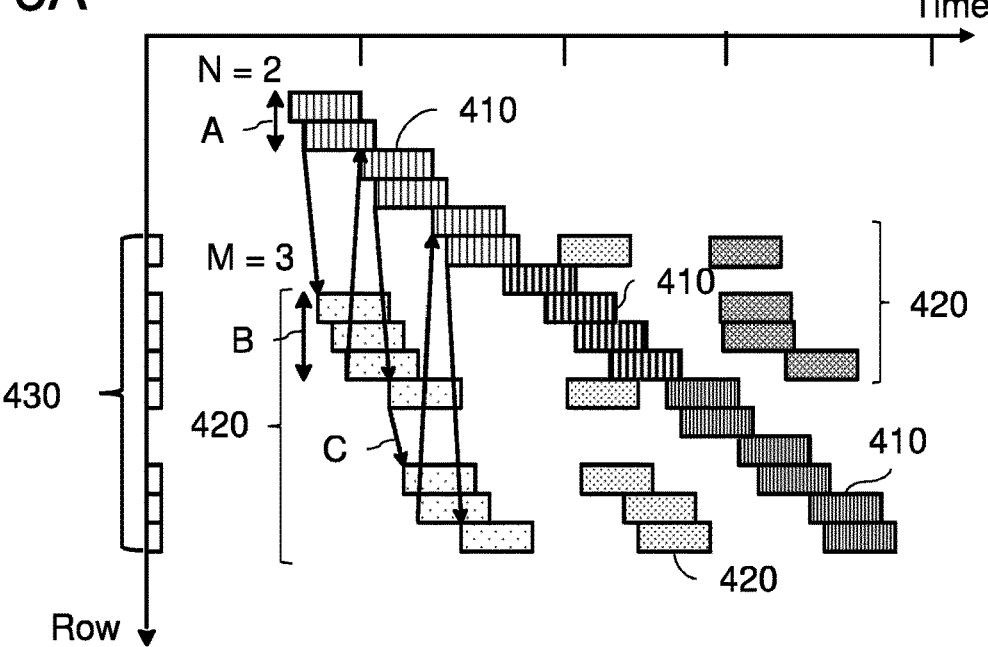
FIGS. 8A to 8C show simplified timing diagrams of imaging signal readout.
Figure 8B:
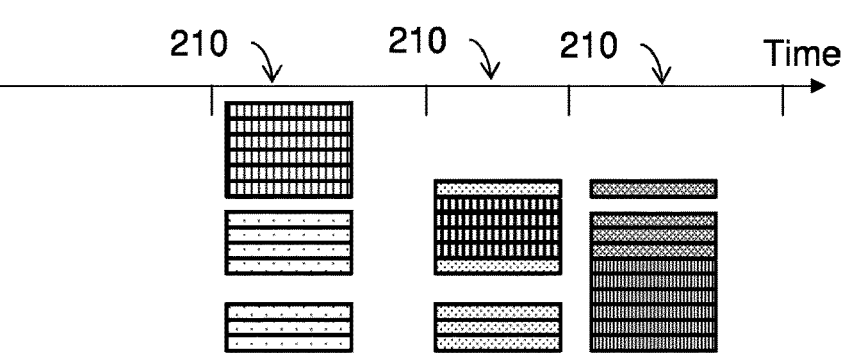
Figure 8C:
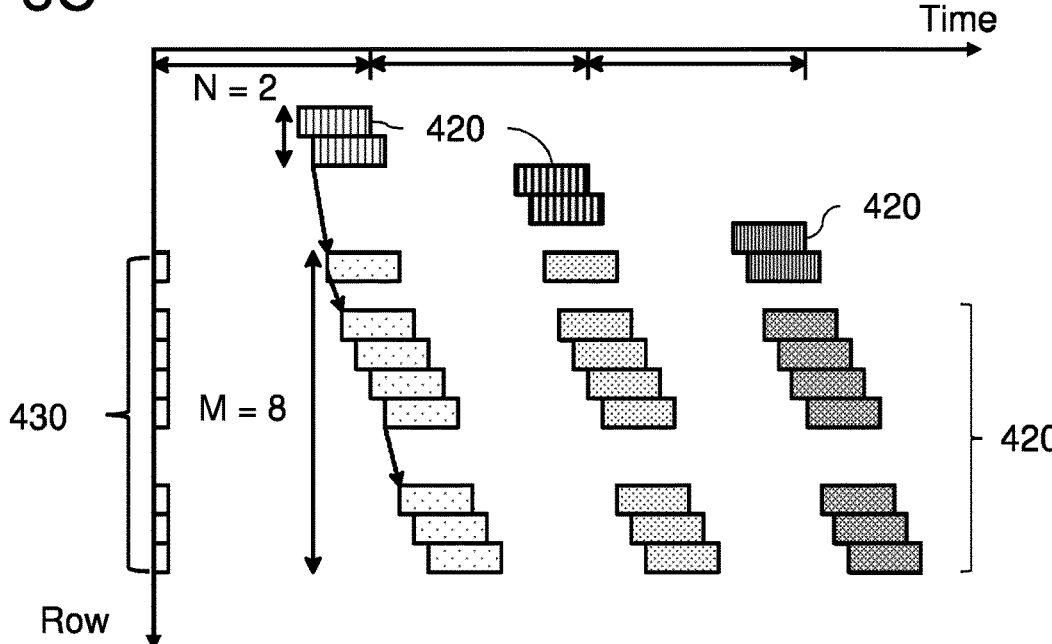

This is illustrated in an exemplary manner in FIGS. 8A to 8C. FIG. 8A shows a readout sequence along the rows of a pixel array 110 over time. Each block in FIG. 8A corresponds to the readout of one row of the pixel array. Here vertically hatched blocks correspond to rows that are read out as part of a base frame 410, while all other block correspond to rows of inner frames 420. i.e. to rows containing a pixel group 112 whose event count has crossed the readout threshold, where the row position is indicated at the left by the blocks 430. As indicated by the arrows A and B, after readout of a number of N base frame rows (N=2 in the example of FIG. 8A), a number of M inner frame rows (M=3 in the example of FIG. 8B) is read out, which is illustrated for a first readout frame 210 by the series of arrows C connecting the different frame rows.

In this manner readout frames 210 are formed as shown in FIG. 8B that consist of rows belonging to the base frame 410 and of rows of inner frames 420. The complete information about the full pixel array 110 provided by the base frame 410 is therefore not necessarily provided as a single readout frame 210, but may be distributed across several readout frames 210. But since the base frame rows 410 are read out in a rolling fashion, the full image will be updated with a predetermined timing even, if no events are detected. However, this update can be performed with a lower frame rate than used in conventional image sensors, since occurring of substantial changes in the captured scenes will be covered by the inner frames that will be additionally obtained in this situation.

Both, the number N of consecutively read out rows of the base frame 410 and the number M of consecutively read out rows of inner frames 420 can be adjustable to fine tune the performance of the solid state imaging device 100.

Moreover, the time interval that is available for generating a readout frame 210 may be variable and depend on the number of occurring inner frames or may be fixed and long enough to allow readout of all M inner frame rows.

For example, in FIG. 8A the time interval for obtaining is variable and ends e.g. only if the last row of the pixel array has been read out. On the other hand. FIG. 8B shows an example that has fixed, but long enough time intervals to allow the readout of all M=8 inner frame rows 420.

Although the above has been described at the level of readout rows, just the same can be performed on a pixel group or even on a pixel basis. i.e. by constituting the base frame by imaging signals of single pixels 111 contained in different readout frames together with imaging signals of pixels 111 belonging to groups 112 at or above the threshold.

Figure 9:
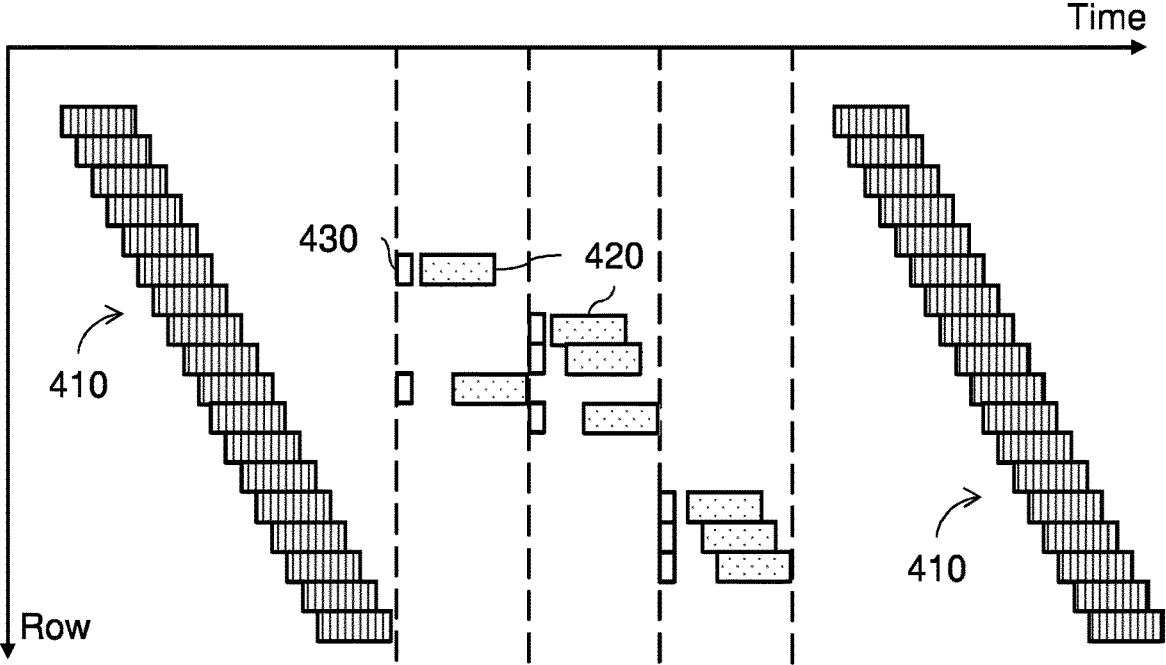
FIG. 9 shows another simplified timing diagram of imaging signal readout.

Just the same, an interleaving of base frame rows 410 and inner frame rows 420 is not necessary. Instead, as shown in FIGS. 7B and 9 it is also possible to first finish the readout of a single base frame 410 before starting to readout inner frames. As shown in FIG. 9 inner frames are read out with a higher frame rate than base frame in this implementation.

Figure 10:
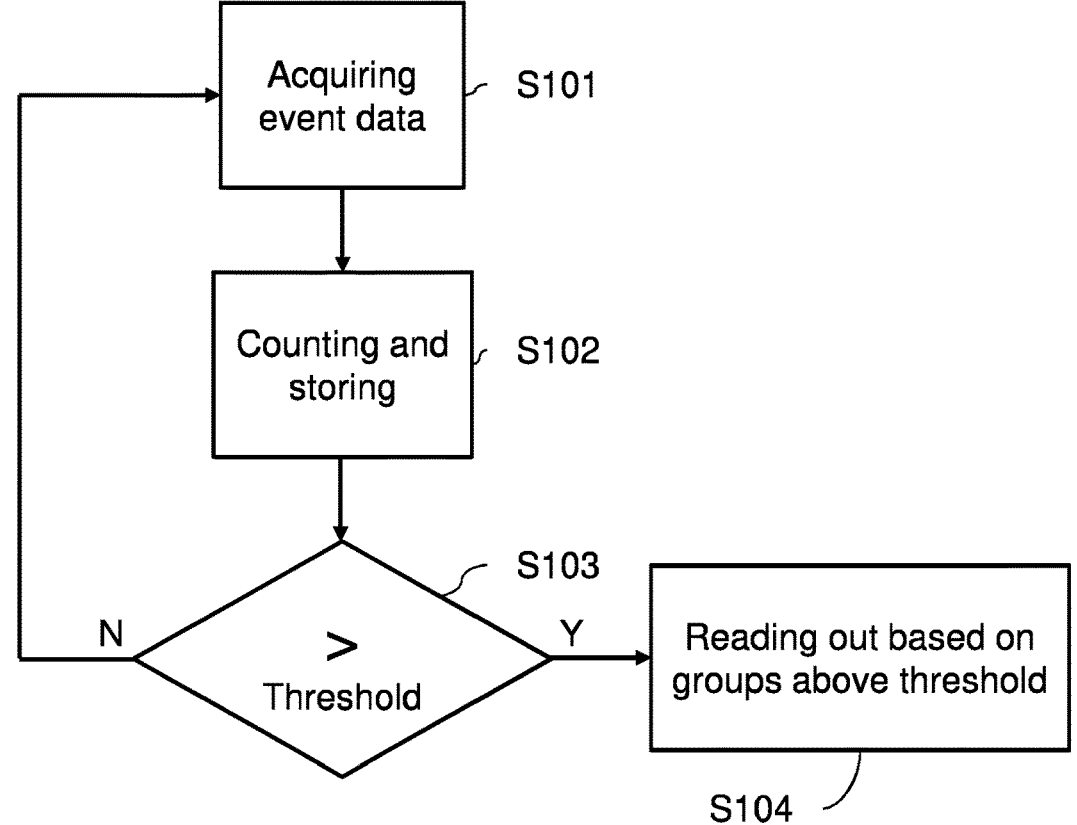
FIG. 10 is a simplified process flow of a method of selecting imaging signals for readout.

The overall process flow carried out by the control unit 115 for selecting which imaging pixels 111 to read out is schematically illustrated in FIG. 10. At S101 event data of the various imaging pixels 111 within the groups are acquired. At S102 the events are counted and the result of the count is stored. At S103 it is determined whether the counted number of events for a given pixel group is (at or) above the predetermined readout threshold. If this is not the case (N) the process returns to S101. If the readout threshold has been crossed (Y), readout of imaging signals of the pixels of the respective group or of all groups with event counts above the readout threshold is carried out at S104.

Here, acquisition of event data may be carried out by the data acquisition unit 117. The data acquisition unit 117 receives the event stream, i.e. the data 117a indicating the occurrence of an event obtained e.g. in the manner described above with respect to FIG. 1B. For each event the column and row address is extracted in an address extraction unit 117b. The address extraction unit 117b forwards a Read_Mem_Valid signal 117d to a memory unit 510 and to a memory addressing unit 117c that calculates the address for storing the event count in the memory unit 510 based on the row and column address. In this manner the memory addressing unit 117c provides the map for relating count values to imaging pixel positions in the pixel array 110 that is e.g. necessary for establishing the flag representation 200. The memory addressing unit 117c forwards a Read_Adress signal 117e and a Write_Adress signal 117f to the memory unit 510. In addition, the address extraction unit 117b outputs various control signals 117g that might be needed for controlling the counting of the event numbers of the various groups. The control signals 117 may e.g. include information about completion of event processing for each pixel group or for each row of pixel groups. Further, the control signal 117b may comprise enable signals for reading and writing into caches used for counting as will be described with respect to FIG. 13.

The event count performed at S102 may be carried out in the smart active pixel trigger unit 118. Of course counting may be carried out in any other part of the control unit 115, too.

Figures 11, 12A, 12B:
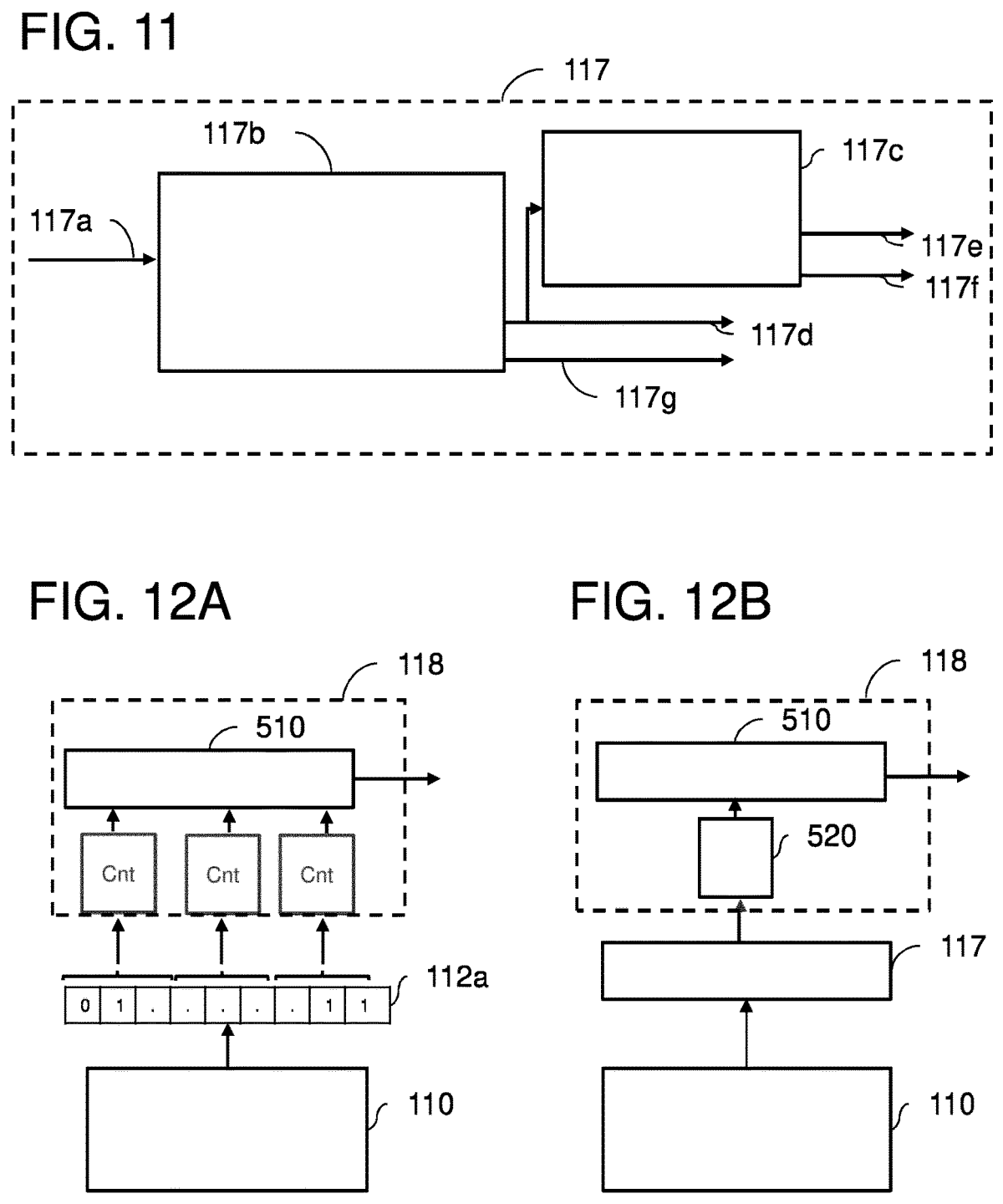

As shown in FIG. 12A for each row 112a of groups within the pixel array 110 events per group can be counted columnwise by a counter Cnt and stored to the memory unit 510. Although this allows for a parallel calculation of the total number of events for patch rows, there is the drawback of area overhead due to the presence of multiple counters Cnt. In addition, latency reduction might be constrained by the number of simultaneous writes in the memory unit 510.

Alternatively, as shown in FIG. 12B a sequential count of events occurring in each of the groups of one row can be carried out. Here, the addresses of the imaging pixels 111 are forwarded in a sequential manner for the single groups to the data acquisition unit 117 that generates memory addresses in the memory unit 510 and controls a storing and counting unit 520 that recognizes multiple occurrence of addresses and stores the event count value obtained in this manner into the memory unit 510.

As a further alternative, events may be counted by using shift registers for the pixel groups. Whenever an event occurs in one of the groups an entry of "1" in the shift register (that contains otherwise only "0" entries) is moved. Once the entry of "1" reaches a predetermined position in the shift register that corresponds to the value of the readout threshold, a flag is set that triggers readout of the corresponding pixel group. This has the advantage that no additional memory for storing count results is necessary. However, using a counter and pixel addresses as described above for FIG. 12B allows carrying out the counting in a more efficient manner.

Figure 13:
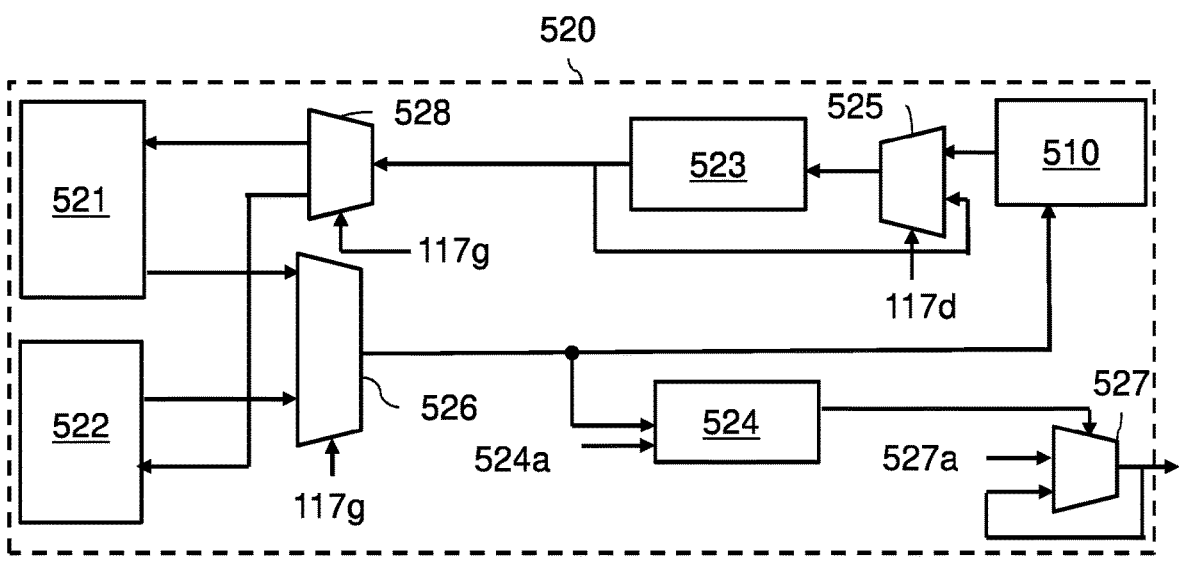
FIG. 13 is a simplified block diagram of a storing and counting unit for event count.

An example of the storing and counting unit 520 is schematically illustrated in FIG. 13. As main components the storing and counting unit 520 comprises a first cache 521, a second cache 522, an incrementing unit 523 and an event comparator 524 that operate in connection with the memory unit 510. Further, the storing and counting unit 520 comprises a first multiplexer 525, a second multiplexer 526, a third multiplexer 527, and a demultiplexer 528.

The first multiplexer 525 has one entry receiving a count value of a pixel group from the corresponding location of the memory unit 510 and an output leading to the incrementing unit 523. The output of the incrementing unit is on the one hand fed back to the other entry of the first multiplexer 525 and is on the other hand provided to the entry of the demultiplexer 528. If the first multiplexer receives the Read_Mem_Valid signal 117d from the data acquisition unit 117 the input from the memory unit 510 is forwarded, otherwise the entry of the feedback loop is input.

The demultiplexer 528 provides the signal from the incrementing unit 523 either to the first cache 521 or the second cache 521, based on the control signals 117d from the data acquisition unit 117. For example, if it is indicated that a row of groups has been completely treaded, the first cache 521 or the second cache 522 can be selected based on an according control signal.

While count values are stored into one of the two caches 521, 522, values are read out from the other cache 521, 522 to be fed back to the memory unit and to be compared to the readout threshold value 524a. This is carried out by the second multiplexer 526 being controlled by the control signals 117g of the data acquisition unit 117. For example, from which cache to read is determined by the completion of treatment of a group, whether or not reading from the memory unit is possible, on the cache control selecting one of the caches 521, 522 and on the complete treatment of all pixels 111 in the pixel array 210. i.e. of a single complete frame.

The count value output from the cache 521, 522 enabled for reading is compared in the event comparator 524 with the readout threshold value 524a. The binary result of the comparison is used as select input of the third multiplexer. If the group for which the count is done is above the readout threshold, the corresponding address 527 in the pixel array 110 is output for readout of the corresponding imaging signals. If not, the last output address is reiterated as output. e.g. a data valid signal can be sent out with the output address to determine when output data is updated (valid signal 1) and when it is reiterated (valid signal 0).

Here, the memory unit 510 that is used to store the count values of each of the pixel groups may be implemented as single-port SRAM, while the illustrated dual-port caches 521, 522 are used to store intermediate count values. A single port SRAM memory unit 510 comes with the advantage that only comparatively little area is needed, in particular compared to its dual-port counterparts. Due to the limitations on memory access for single-port SRAMs the e.g. flip-flop based dual-port caches are introduced, which can also be formed sufficiently small to reduce an area overhead. Of course, instead of the single-port SRAM any other type of storage may be used as the memory unit 510. Further, also the dual-port caches 521, 522 may be implemented by any type of storage element as long as their described functions can be implemented.

With the implementation of the storing and counting unit 520 shown in FIG. 13 it is e.g. possible to count the number of events per imaging pixel 111 along the rows of the pixel array 110. For groups having M columns and N rows, the counting of the first row of groups will be finished after operating on the first N rows of the pixel array. After finishing the first N rows, the content of the memory unit 510) is updated. i.e. the final count values are stored. At the same time reading and writing is switched between the first cache 521 and the second cache 522. Thus, while for the first N rows e.g. the first cache 521 stored the incrementing count values of the corresponding pixel groups, for the second N rows, the second cache 522 will take over the storage of the intermediate count values, while the first cache 521 will forward the count values stored therein to the memory unit 510 for final storage. After the second N rows, the roles will switch again, repeating this switch until the event count for the entire pixel array 110 has been finished. Then, counting of events per pixel 111 will start anew using the previously stored count values of the memory unit 510) as starting points, unless a reset of the count values has occurred in the meantime.

In this manner, event count and according selection of pixel area regions for readout can be performed in an efficient manner. Of course, it would also be possible to use more than two caches, if necessary. Also, it is to be understood that event count and storing of event data can be performed in a different manner, as long as selection of imaging regions based on the event number is possible.

Figure 14:
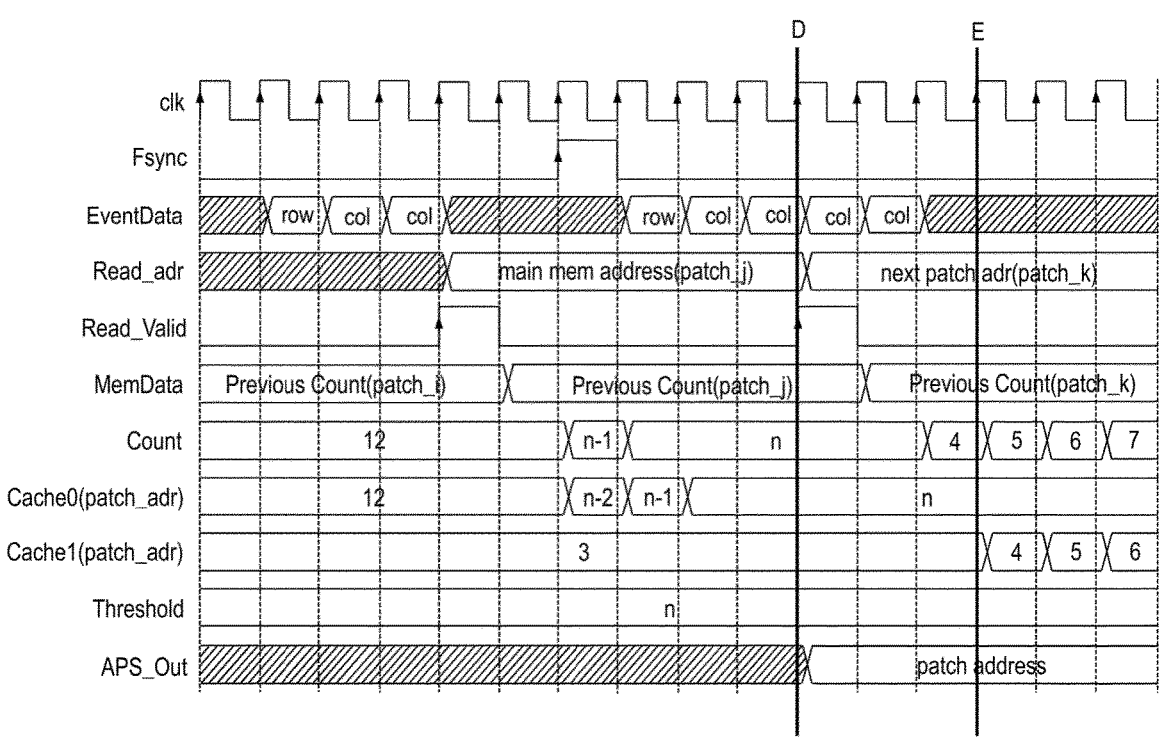
FIG. 14 is a schematic timing diagram of an event count.

FIG. 14 illustrates schematically an exemplary timing diagram of the event count. As can be seen in the third line of the diagram, event data for a given row are obtained column wise. The corresponding addresses are generated as indicated in the fourth line. As can be seen from the change of "patch_j" to "patch_k" at the line D, the column events in the second row of the "EventData" line belong to two different pixel groups. The fifth line shows the Read-_Mem_Valid signal that allows reading of memory data of the single pixel groups as indicated in the sixth line. "Mem-Data".

Also, after the Read_Mem_Valid signal, the count numbers stored in the memory are fetched as shown in the seventh line. "Count". The next two lines show the respective entries of the first cache 521 (eighth line. "Cache0") and the second cache (ninth line. "Cache1"). Here, at first the first cache 521 stores the increasing count values. These count values are compared to the readout threshold shown in the tenth line. If the count number is at or above the readout threshold after count for one group is finished (line D in FIG. 14), the corresponding row and column address of this image patch is output for readout, as indicated in the twelfth line "APS_Out". It should be noted that what is also schematically indicated is the switching between caches (after line E), where the count value of the first cache 521 remains at "n", while the count value in the second cache 522 increases according to the increase in the line "Count".

Further modifications of the above will be described in the following with respect to FIGS. 15 to 17. Here description of non-modified parts and functions is omitted for the sake of brevity.

Figure 15:
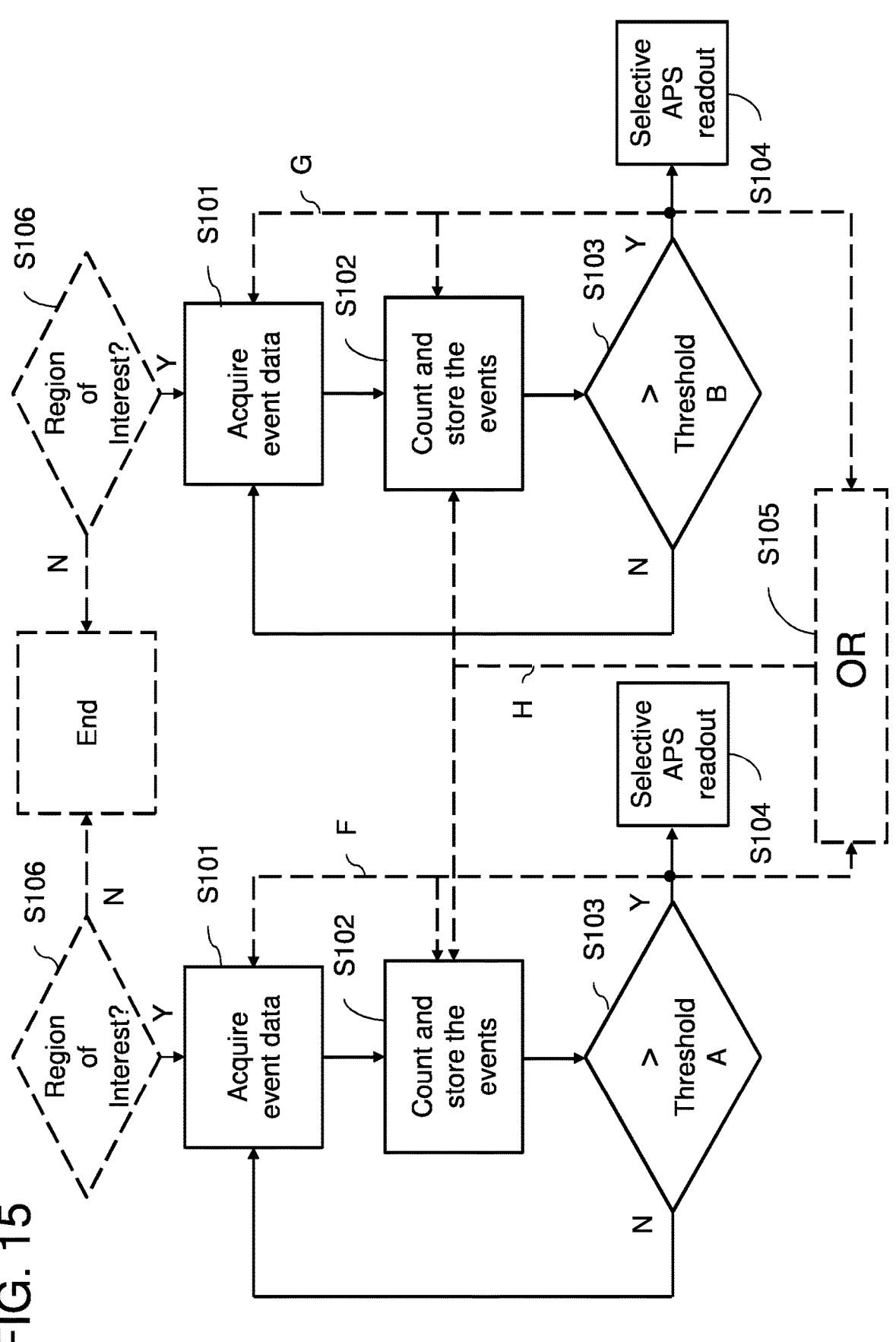
FIG. 15 is a simplified process flow of a method of selecting imaging signals for readout.

FIG. 15 shows a schematic process flow that illustrates possible manners of implementing event count and selection of imaging signals for different pixel groups. Here, two process flows as discussed above with respect to FIG. 10 are shown that refer to counting events of different pixel groups. Once, it is determined that readout threshold values are crossed at S103, the counter for the respective group can be reset, as illustrated by the dashed arrows F and G. That is, once the imaging signals of a group that has crossed the readout threshold are read out, the event count for this group starts anew from zero, since the content of the respective memory address is reset.

Additionally or alternatively, resetting of the count value across different groups can be performed as indicated by S105 and arrow H. For example, the values of all counters can be reset, if the readout threshold of a single group is crossed. This means that after a sufficient amount of change has occurred for the first time, all event counts are reset, and the next pixel group is only read out until a sufficient amount of change has occurred again. This will lead to an increased bandwidth reduction. A further alternative (not illustrated) is that for this global reset a reset threshold is implemented that indicates a number of groups that have crossed a readout threshold. Global reset will then only be carried out, if the number of groups that have been readout is larger than or equal to the reset threshold.

Additionally or alternatively, the count values of all or some of the groups can be reset after predetermined time intervals that may or may not be adjustable globally or locally. This ensures that only changes occurring during comparatively short time periods will trigger readout, while changes accumulating over a longer time period will not, since the event counts are set to zero from time to time.

Figure 16:
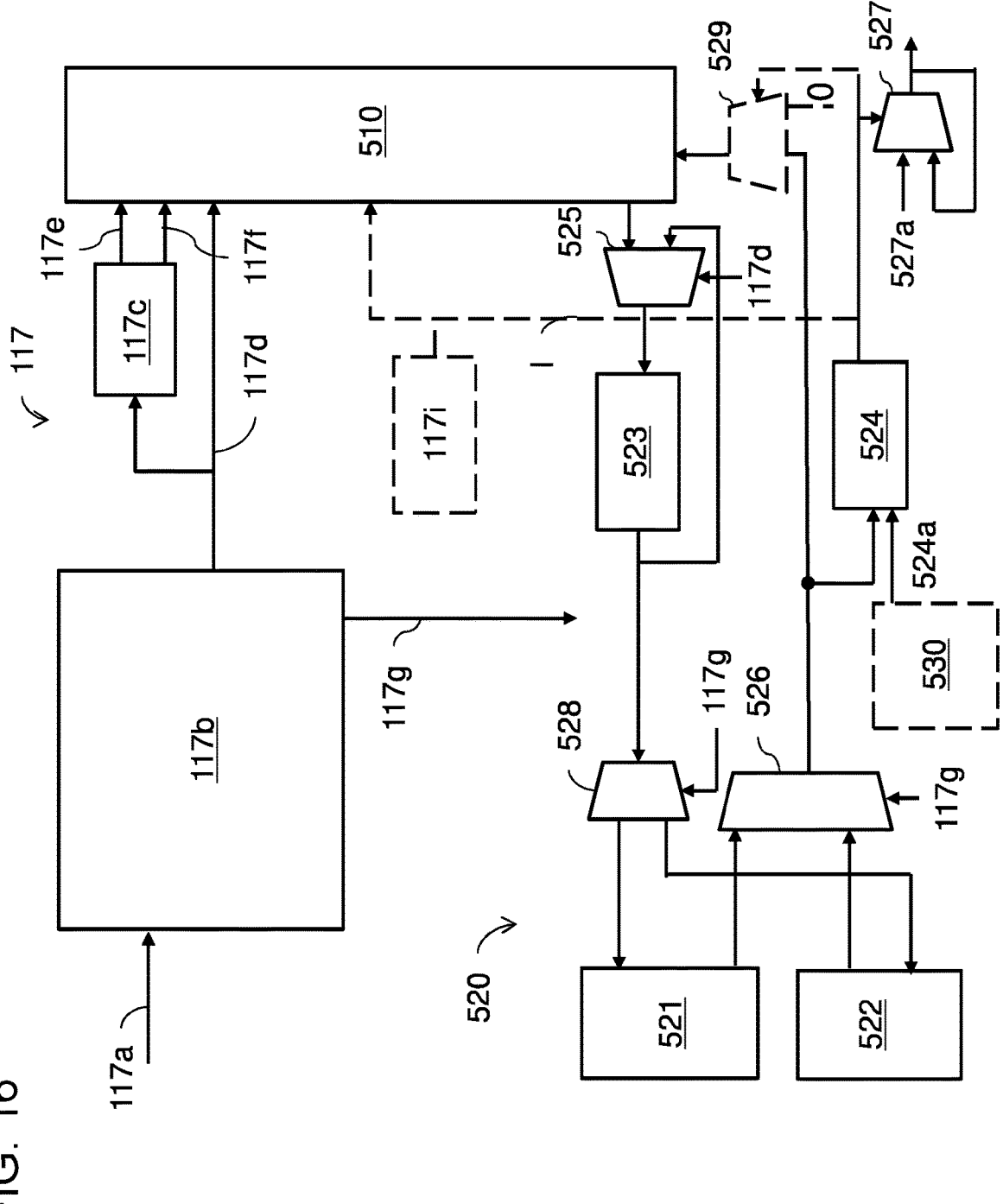
FIG. 16 is a simplified block diagram of an interaction of a data acquisition unit and a storing and counting unit.

Examples how to implement these functions are indicated in dashed lines in FIG. 16 showing the acquisition unit 117 and the storing and counting unit 520, the functions of which are as explained above. For locally resetting the count value for a single group a fourth multiplexer 529 may be used that is controlled by the output of the event comparator 524. If the count value of this group crosses the predetermined threshold value 524a "0" is output by the fourth multiplexer 529. Otherwise the count value read out from the caches

521, 522 is forwarded to the memory unit 510. In this manner, it is possible to locally reset the count value for a single pixel group.

Further, as indicated by the arrow I the output of the event comparator 524 may be fed into the data acquisition unit 117 as a reset signal for all count values in the memory unit 510. Also, although not illustrated, the data acquisition unit 117 may comprise logic to compare the number of pixel groups above the readout threshold with the reset threshold and effect resetting only, if the reset threshold is crossed.

Further, the data acquisition unit 117 may comprise one or a plurality of timers 117i that can carry out local or global reset of count values after predetermined or adjustable time intervals.

In addition to the various possibilities to reset count values, selection of imaging signals to be read out may also be made more flexible by allowing different readout threshold for different pixel groups. This is illustrated in FIG. 15 by referring to different thresholds A and B at S103, and may be implemented as exemplarily shown in FIG. 16 by a dedicated storage element 530 or by using the memory unit 510. Although different readout threshold for different pixel groups allow for more flexibility, memory overhead increases for a too large amount of different thresholds, which might limit the number of pixel groups and therefore the granularity of the event based readout.

Although the above described methods and devices reduce readout of redundant information, it might be advantageous in certain situations to focus the readout of imaging signals only to specific regions of interest of the pixel array 110. e.g. to a center region of the pixel array 110. This allows also a further reduction of power consumption. To this end, an additional query can be implemented at S106 where it is asked whether the pixel group at hand belongs to a region of interest. If so (Y), the process starts with S101 as described above. If not (N) event count is disabled for that pixel group (End).

Figure 17:
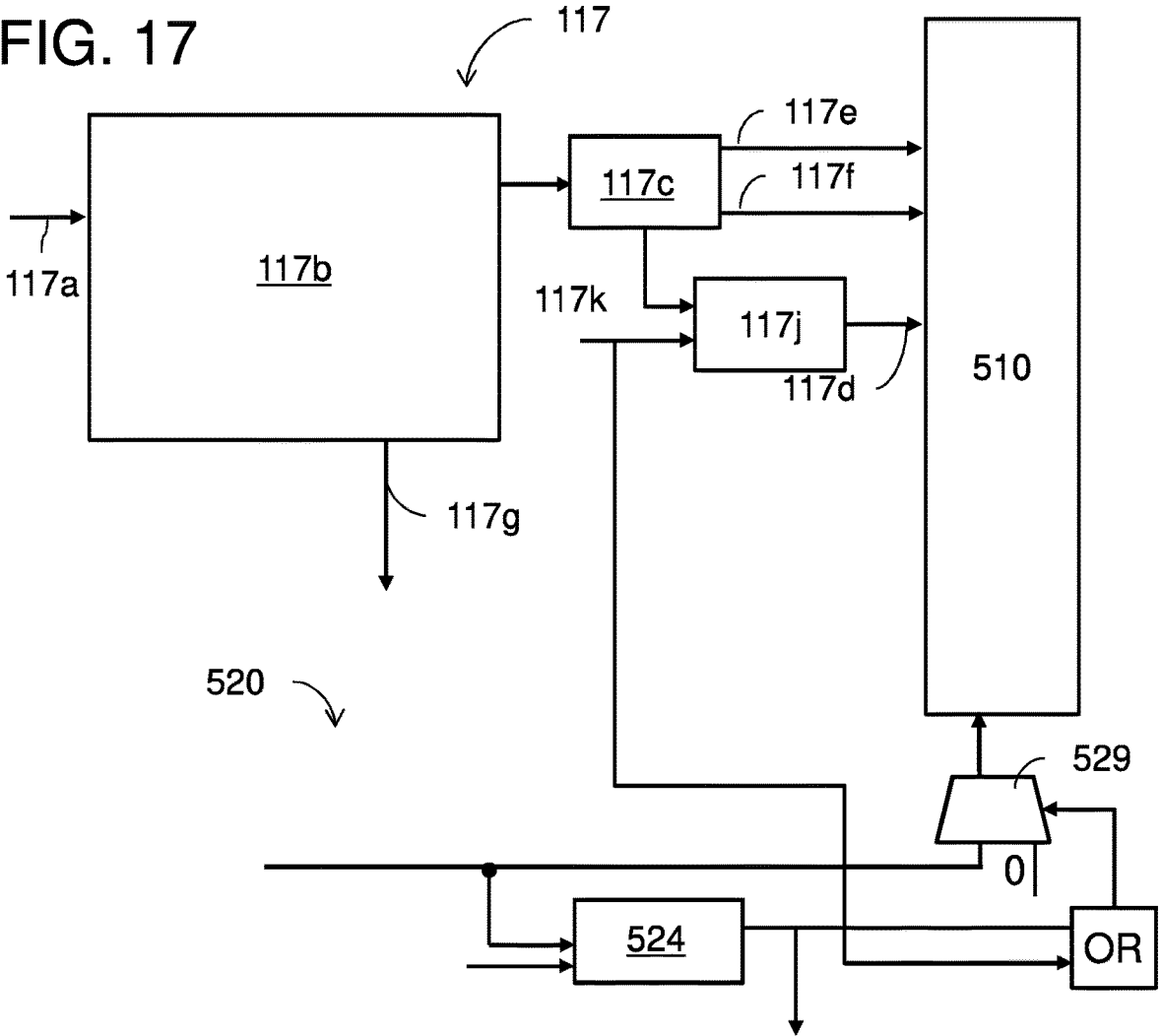
FIG. 17 is another simplified block diagram of an interaction of a data acquisition unit and a storing and counting unit.

One exemplary manner to implement this is shown in FIG. 17 where the relevant parts of the data acquisition unit 117 and the storing and counting unit 520 are shown. Here, the data acquisition unit 117 comprises an enable flag register 117j that stores enable/disable flags for each of the pixel groups. These flags can be updated after predetermined time intervals by region control data 117k. By connecting the region control data 117k to the fourth multiplexer 529, it can be effected that not only for a local reset the count value of a pixel group is set to zero, but also once a pixel group is disabled.

In this process, the memory addressing unit 117c calculates the memory address for the respective enable/disable flag by referring to the column and row values of the imaging pixels 111 at hand and sends it to the enable flag register 117j. If the pixel group is according to the region control data 117k belonging to a region of interest, a corresponding active bit is set in the enable flag register and functions as read valid signal 117d for the memory unit 510. If the flag for the pixel group is disabled, no further data will be read from the memory unit 510, the count operations will be paused, and the count value will be set to zero as described above. In this manner focusing to specific regions of interest can be achieved, which can lead to further reduction of energy consumption and processing power.

Figure 18:
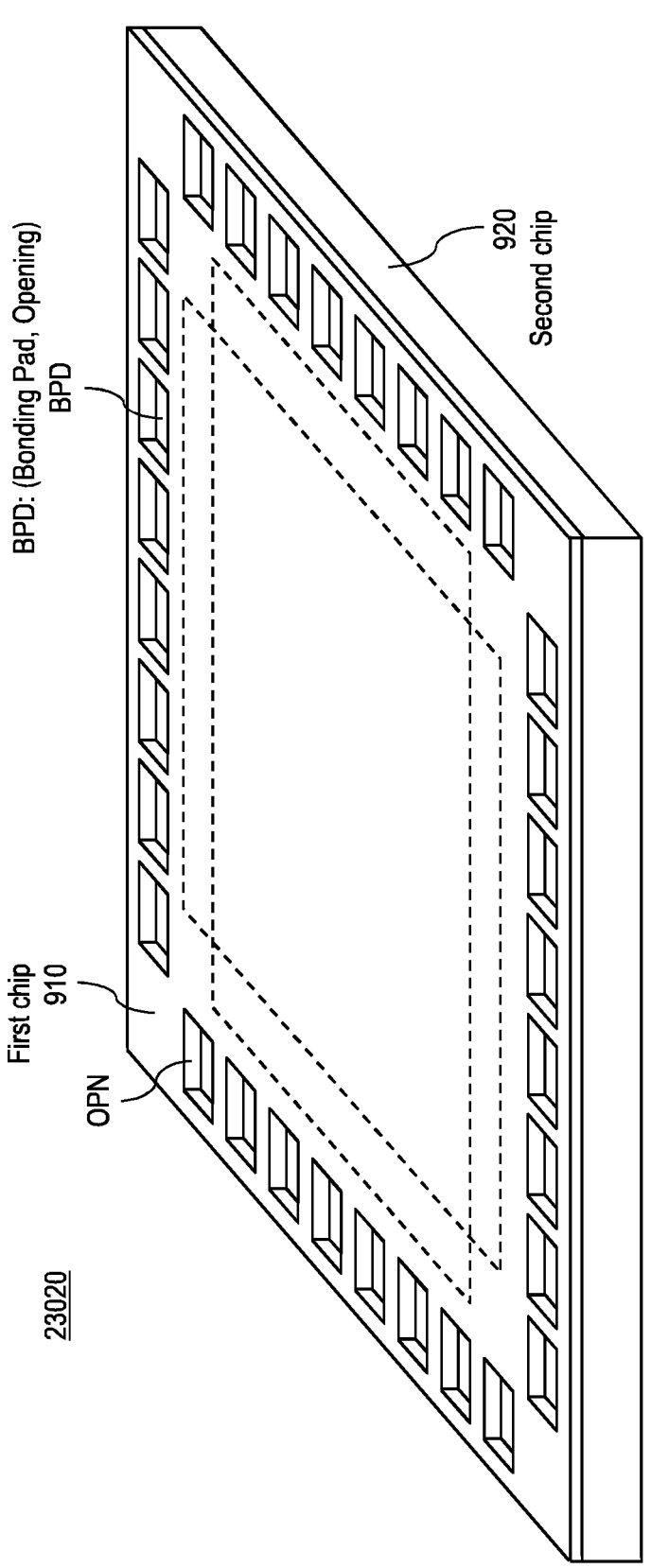
FIG. 18 is a simplified perspective view of a solid-state imaging device with laminated structure according to an embodiment of the present disclosure.

FIG. 18 is a perspective view showing an example of a laminated structure of a solid-state imaging device 23020 with a plurality of pixels arranged matrix-like in array form in which the functions described above may be implemented. Each pixel includes at least one photoelectric conversion element.

The solid-state imaging device 23020 has the laminated structure of a first chip (upper chip) 910 and a second chip (lower chip) 920.

The laminated first and second chips 910, 920 may be electrically connected to each other through TC(S)Vs (Through Contact (Silicon) Vias) formed in the first chip 910.

The solid-state imaging device 23020 may be formed to have the laminated structure in such a manner that the first and second chips 910 and 920 are bonded together at wafer level and cut out by dicing.

In the laminated structure of the upper and lower two chips, the first chip 910 may be an analog chip (sensor chip) including at least one analog component of each pixel, e.g., the photoelectric conversion elements arranged in array form. For example, the first chip 910 may include only the photoelectric conversion elements.

Alternatively, the first chip 910 may include further elements of each photoreceptor module. For example, the first chip 910 may include, in addition to the photoelectric conversion elements, at least some or all of the n-channel MOSFETs of the photoreceptor modules. Alternatively, the first chip 910 may include each element of the photoreceptor modules.

The first chip 910 may also include parts of the pixel back-ends 300. For example, the first chip 910 may include the memory capacitors, or, in addition to the memory capacitors sample/hold circuits and/or buffer circuits electrically connected between the memory capacitors and the event-detecting comparator circuits. Alternatively, the first chip 910 may include the complete pixel back-ends. With reference to FIG. 1A, the first chip 910 may also include at least portions of the readout circuit 140, the threshold generation circuit 130 and/or the controller 120 or the entire control unit.

The second chip 920 may be mainly a logic chip (digital chip) that includes the elements complementing the circuits on the first chip 910 to the solid-state imaging device 23020. The second chip 920 may also include analog circuits, for example circuits that quantize analog signals transferred from the first chip 910 through the TCVs.

The second chip 920 may have one or more bonding pads BPD and the first chip 910 may have openings OPN for use in wire-bonding to the second chip 920.

The solid-state imaging device 23020 with the laminated structure of the two chips 910, 920 may have the following characteristic configuration:

The electrical connection between the first chip 910 and the second chip 920 is performed through, for example, the TCVs. The TCVs may be arranged at chip ends or between a pad region and a circuit region. The TCVs for transmitting control signals and supplying power may be mainly concentrated at, for example, the four corners of the solid-state imaging device 23020, by which a signal wiring area of the first chip 910 can be reduced.

Typically, the first chip 910 includes a p-type substrate and formation of p-channel MOSFETs typically implies the formation of n-doped wells separating the p-type source and drain regions of the p-channel MOSFETs from each other and from further p-type regions. Avoiding the formation of p-channel MOSFETs may therefore simplify the manufacturing process of the first chip 910.

Figure 19:
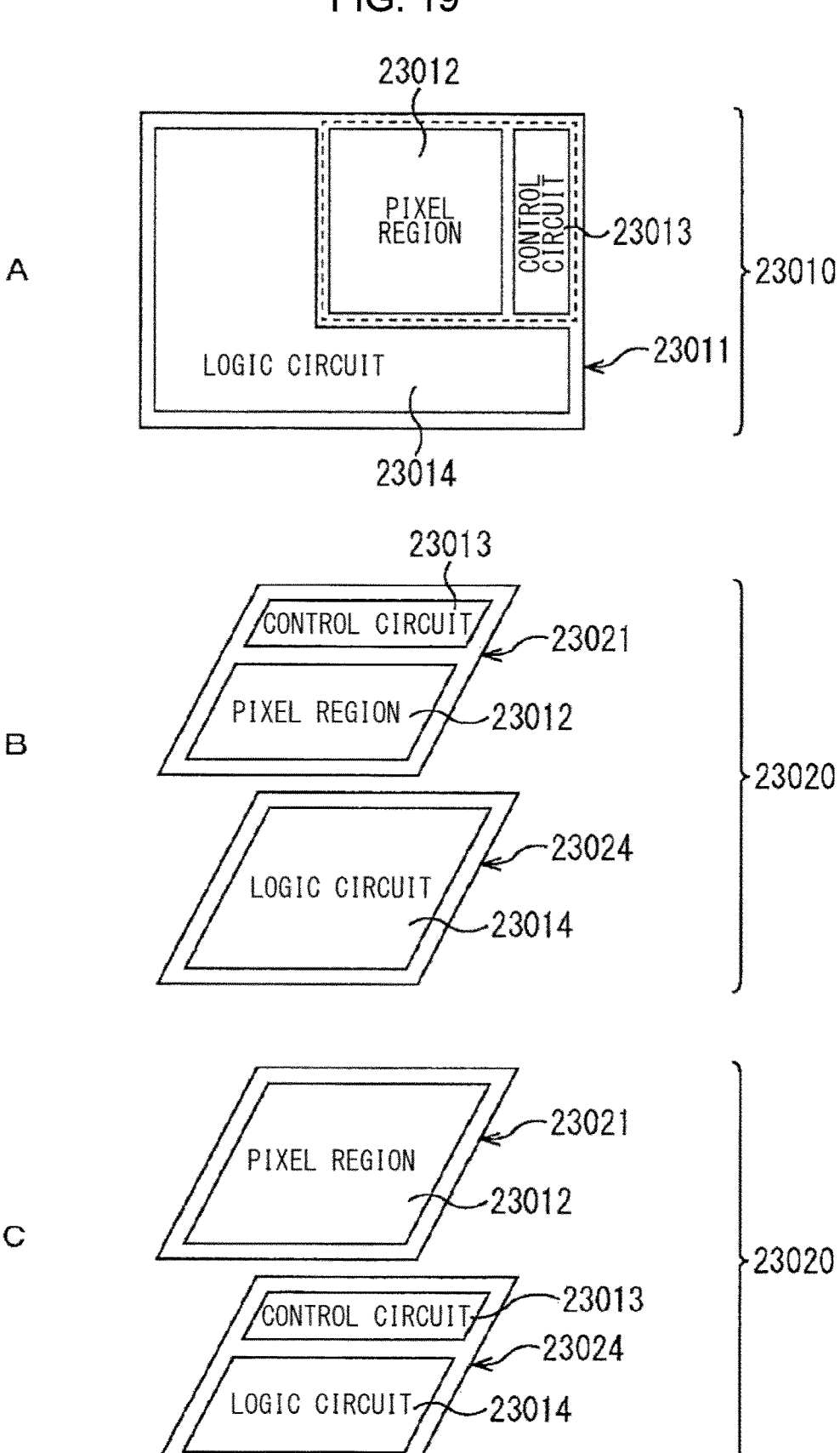
FIG. 19 illustrates simplified diagrams of configuration examples of a multi-layer solid-state imaging device to which a technology according to the present disclosure may be applied.

FIG. 19 illustrates schematic configuration examples of solid-state imaging devices 23010, 23020.

The single-layer solid-state imaging device 23010 illustrated in part A of FIG. 19 includes a single die (semiconductor substrate) 23011. Mounted and/or formed on the single die 23011 are a pixel region 23012 (photoelectric conversion elements), a control circuit 23013 (readout circuit, threshold generation circuit, controller, control unit), and a logic circuit 23014 (pixel back-end). In the pixel region 23012, pixels are disposed in an array form. The control circuit 23013 performs various kinds of control including control of driving the pixels. The logic circuit 23014 performs signal processing.

Parts B and C of FIG. 19 illustrate schematic configuration examples of multi-layer solid-state imaging devices 23020 with laminated structure. As illustrated in parts B and C of FIG. 19, two dies (chips), namely a sensor die 23021 (first chip) and a logic die 23024 (second chip), are stacked in a solid-state imaging device 23020. These dies are electrically connected to form a single semiconductor chip.

With reference to part B of FIG. 19, the pixel region 23012 and the control circuit 23013 are formed or mounted on the sensor die 23021, and the logic circuit 23014 is formed or mounted on the logic die 23024. The logic circuit 23014 may include at least parts of the pixel back-ends. The pixel region 23012 includes at least the photoelectric conversion elements.

With reference to part C of FIG. 19, the pixel region 23012 is formed or mounted on the sensor die 23021, whereas the control circuit 23013 and the logic circuit 23014 are formed or mounted on the logic die 23024.

According to another example (not illustrated), the pixel region 23012 and the logic circuit 23014, or the pixel region 23012 and parts of the logic circuit 23014 may be formed or mounted on the sensor die 23021, and the control circuit 23013 is formed or mounted on the logic die 23024.

Within a solid-state imaging device with a plurality of photoreceptor modules PR, all photoreceptor modules PR may operate in the same mode. Alternatively, a first subset of the photoreceptor modules PR may operate in a mode with low SNR and high temporal resolution and a second, complementary subset of the photoreceptor module may operate in a mode with high SNR and low temporal resolution. The control signal may also not be a function of illumination conditions but, e.g., of user settings.

Application Example to Mobile Body

The technology according to the present disclosure may be realized, e.g., as a device mounted in a mobile body of any type such as automobile, electric vehicle, hybrid electric vehicle, motorcycle, bicycle, personal mobility, airplane, drone, ship, or robot.

Figure 20:
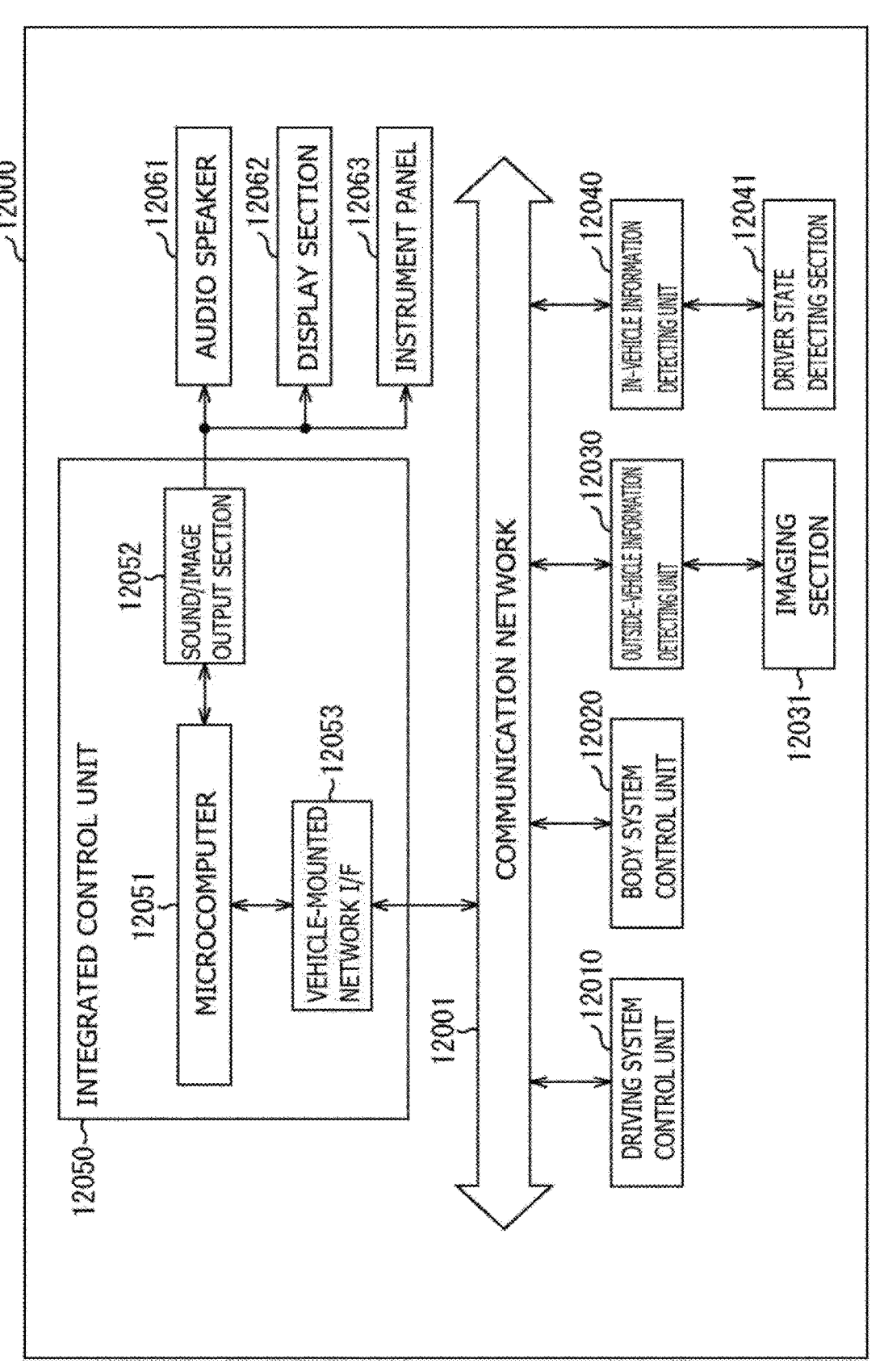
FIG. 20 is a block diagram depicting an example of a schematic configuration of a vehicle control system.

FIG. 20 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 20, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 imaging an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 may be or may include a solid-state imaging sensor with event detection and photoreceptor modules according to the present disclosure. The imaging section 12031 may output the electric signal as position information identifying pixels having detected an event. The light received by the imaging section 12031 may be visible light, or may be invisible light such as infrared rays or the like.

The in-vehicle information detecting unit 12040 detects information about the inside of the vehicle and may be or may include a solid-state imaging sensor with event detection and photoreceptor modules according to the present disclosure. The in-vehicle information detecting unit 12040 is, for example, connected with a driver state detecting section 12041 that detects the state of a driver. The driver state detecting section 12041, for example, includes a camera focused on the driver. On the basis of detection information input from the driver state detecting section 12041, the in-vehicle information detecting unit 12040) may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or audible notifying information to an occupant of the vehicle or the outside of the vehicle. In the example of FIG. 20, an audio speaker 12061, a display section 12062, and an instrument panel 12063 are illustrated as the output device. The display section 12062 may, for example, include at least one of an on-board display or a head-up display.

Figure 21:
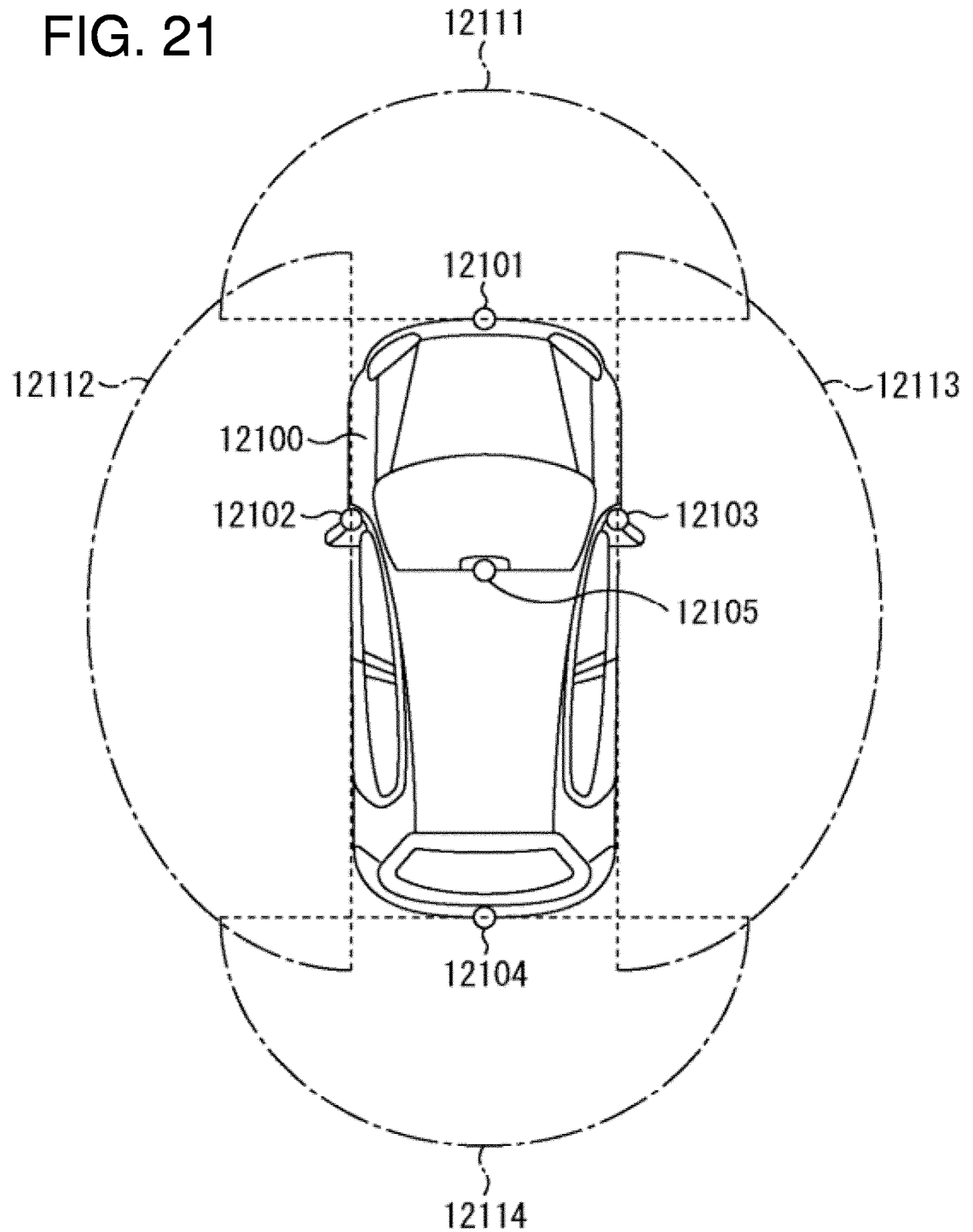
FIG. 21 is a diagram of assistance in explaining an example of installation positions of an outside-vehicle information detecting section and an imaging section of the vehicle control system of FIG. 20.

FIG. 21 is a diagram depicting an example of the installation position of the imaging section 12031, wherein the imaging section 12031 may include imaging sections 12101, 12102, 12103, 12104, and 12105.

The imaging sections 12101, 12102, 12103, 12104, and 12105 are, for example, disposed at positions on a front nose, side-view mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the side view mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally. FIG. 21 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the side view mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to the present disclosure is applicable has been described above. By applying the photoreceptor modules for obtaining event-triggered image information, the image data transmitted through the communication network may be reduced and it may be possible to reduce power consumption without adversely affecting driving support.

Additionally, embodiments of the present technology are not limited to the above-described embodiments, but various changes can be made within the scope of the present technology without departing from the gist of the present technology.

The solid-state imaging device according to the present disclosure may be any device used for analyzing and/or processing radiation such as visible light, infrared light, ultraviolet light, and X-rays. For example, the solid-state imaging device may be any electronic device in the field of traffic, the field of home appliances, the field of medical and healthcare, the field of security, the field of beauty, the field of sports, the field of agriculture, the field of image reproduction or the like.

Specifically, in the field of image reproduction, the solid-state imaging device may be a device for capturing an image to be provided for appreciation, such as a digital camera, a smart phone, or a mobile phone device having a camera function. In the field of traffic, for example, the solid-state imaging device may be integrated in an in-vehicle sensor that captures the front, rear, peripheries, an interior of the vehicle, etc. for safe driving such as automatic stop, recognition of a state of a driver, or the like, in a monitoring camera that monitors traveling vehicles and roads, or in a distance measuring sensor that measures a distance between vehicles or the like.

In the field of home appliances, the solid-state imaging device may be integrated in any type of sensor that can be used in devices provided for home appliances such as TV receivers, refrigerators, and air conditioners to capture gestures of users and perform device operations according to the gestures. Accordingly the solid-state imaging device may be integrated in home appliances such as TV receivers, refrigerators, and air conditioners and/or in devices controlling the home appliances. Furthermore, in the field of medical and healthcare, the solid-state imaging device may be integrated in any type of sensor. e.g. a solid-state image device, provided for use in medical and healthcare, such as an endoscope or a device that performs angiography by receiving infrared light.

In the field of security, the solid-state imaging device can be integrated in a device provided for use in security, such as a monitoring camera for crime prevention or a camera for person authentication use. Furthermore, in the field of beauty, the solid-state imaging device can be used in a device provided for use in beauty, such as a skin measuring instrument that captures skin or a microscope that captures a probe. In the field of sports, the solid-state imaging device can be integrated in a device provided for use in sports, such as an action camera or a wearable camera for sport use or the like. Furthermore, in the field of agriculture, the solid-state imaging device can be used in a device provided for use in agriculture, such as a camera for monitoring the condition of fields and crops.

Note that the present technology can also be configured as described below:

(1) A solid state imaging device, comprising:

a pixel array comprising a plurality of imaging pixels, each of which being capable to generate an imaging signal depending on the intensity of light falling on the imaging pixel, and to detect as an event a positive or negative change of light intensity that is larger than a respective predetermined threshold; and a control unit that is configured to count the number of events occurring within at least one group of imaging pixels; and to read out the imaging signals of the imaging pixels within one of the groups, if the according counted number of events is larger than or equal to a predetermined readout threshold.

(2) The solid state imaging device according to (1), wherein the control unit is configured to generate a flag representation of the pixel array indicating the number of events occurred in each of the imaging pixels or in each of the groups of imaging pixels, where there is a one-to-one map between positions of the imaging pixels or groups in the pixel array and the positions of the indication of the number of events within the flag representation; and the control unit is configured to trigger read out of the imaging signals of the groups having crossed the readout threshold by referring to the flag representation.

(3) The solid state imaging device according to any of (1) or (2), wherein the control unit is configured to assign address information to the read out imaging signals belonging to the imaging pixels of one of the groups, which address information allows to locate the position of the group of pixels within the pixel array.

(4) The solid state imaging device according to any of (1) to (3), wherein the pixel array forms a pixel matrix; and the control unit is configured to read out every row of the matrix that comprises an imaging pixel belonging to one of the groups that has crossed the readout threshold.

(5) The solid state imaging device according to any of (1) to (3), wherein in reading out the imaging pixels of the groups that have crossed the readout threshold only the imaging pixels of these groups are read out.

(6) The solid state imaging device according to (5), wherein all groups include the same number of imaging pixels; and all imaging signals of the imaging pixels of the groups that have crossed the readout threshold are arranged in readout lines having a constant length that is equal to the number of imaging pixels in each of the groups.

(7) The solid state imaging device according to any of (1) to (6), wherein the control unit is configured to read out the imaging signals of all imaging pixels with a predetermined timing; and to additionally read out imaging signals of imaging pixels within groups for which the counted number of events is larger or equal to the predetermined readout threshold.

(8) The solid state imaging device according to (7), wherein the additional readout of imaging signals of imaging pixels within groups for which the readout threshold has been crossed is interleaved with the readout of the imaging signals of all imaging pixels with the predetermined timing.

(9) The solid state imaging device according to any of (1) to (8), wherein the pixel array forms a pixel matrix having rows that are fully covered by non-overlapping groups of N×M imaging pixels; and the control unit is configured to count the events occurring in each of the groups of one row sequentially or in parallel to determine whether the readout threshold is crossed for each of the groups.

(10) The solid state imaging device according to (9), further comprising a memory unit configured to store final count values for each of the groups; and a plurality of storage elements configured to alternately store intermediate count values of the groups and to transmit final count values to the memory unit.

(11) The solid state imaging device according to any of (1) to (10), wherein the control unit is configured to reset the counted number of events either globally for all groups, if the readout threshold is crossed for one group or if a predetermined number of groups has crossed the readout threshold, or locally for one group for which the readout threshold is crossed, and/or after a predetermined time interval.

(12) The solid state imaging device according to any of (1) to (11), wherein readout thresholds for at least two of the groups differ, or all groups have the same readout threshold.

(13) The solid state imaging device according to any of (1) to (12), wherein the control unit is configured to suspend event count for imaging pixels within configurable regions of the pixel array.

(14) The solid state imaging device according to any of (1) to (13), wherein the control unit is configured to count the number of events by a counter or by a shift register.

(15) A method for operating a solid state imaging device according to any of (1) to (14), in particular for operating a solid state imaging device comprising a pixel array that comprises a plurality of imaging pixels, each of which being capable to generate an imaging signal depending on the intensity of light falling on the imaging pixel and to detect as an event a positive or negative change of light intensity that is larger than a respective predetermined threshold, the method comprising counting the number of events occurring within at least one group of imaging pixels; and reading out the imaging signals of the imaging pixels within one of the groups, if the according counted number of events is larger than or equal to a predetermined readout threshold.

The invention claimed is:

1. A solid state imaging device, comprising:

a pixel array comprising a plurality of imaging pixels, each of which being capable to generate an imaging signal depending on the intensity of light falling on the imaging pixel, and to detect as an event a positive or negative change of light intensity that is larger than a respective predetermined threshold; and a control unit that is configured to count the number of events occurring within at least one group among a plurality of groups of imaging pixels;

to generate a flag representation comprising flags corresponding to the plurality of groups of imaging pixels, wherein the flags indicate which of the plurality of groups have a counted number of events that is larger than or equal to a predetermined readout threshold; and to read out the imaging signals of the imaging pixels within the groups indicated by the flag representation.

2. The solid state imaging device according to claim 1, wherein the flag representation comprises a one-to-one map between positions of the groups in the pixel array and positions of the flags in the flag representation.

3. The solid state imaging device according to claim 1, wherein the control unit is configured to assign address information to the read out imaging signals belonging to the imaging pixels of one of the groups among the plurality of groups, which address information allows to locate the position of the group of pixels among the plurality of groups within the pixel array.

4. The solid state imaging device according to claim 1, wherein the pixel array forms a pixel matrix; and the control unit is configured to read out every row of the pixel matrix that comprises an imaging pixel belonging to one of the groups among the plurality of groups that has crossed the readout threshold.

5. The solid state imaging device according to claim 1, wherein in reading out the imaging pixels of the groups that have crossed the readout threshold only the imaging pixels of these groups are read out.

6. The solid state imaging device according to claim 5, wherein all groups include the same number of imaging pixels; and all imaging signals of the imaging pixels of the groups that have crossed the readout threshold are arranged in readout lines having a constant length that is equal to the number of imaging pixels in each of the groups.

7. The solid state imaging device according to claim 1, wherein the control unit is configured to read out the imaging signals of all imaging pixels with a predetermined timing; and to additionally read out imaging signals of imaging pixels within groups for which the counted number of events is larger or equal to the predetermined readout threshold.

8. The solid state imaging device according to claim 7, wherein the additional readout of imaging signals of imaging pixels within groups for which the readout threshold has been crossed is interleaved with the readout of the imaging signals of all imaging pixels with the predetermined timing.

9. The solid state imaging device according to claim 1, wherein the pixel array forms a pixel matrix having rows that are fully covered by non-overlapping groups of N×M imaging pixels; and the control unit is configured to count the events occurring in each of the groups of one row sequentially or in parallel to determine whether the readout threshold is crossed for each of the groups.

10. The solid state imaging device according to claim 9, further comprising a memory unit configured to store final count values for each of the groups; and a plurality of storage elements configured to alternately store intermediate count values of the groups and to transmit final count values to the memory unit.

11. The solid state imaging device according to claim 1, wherein the control unit is configured to reset the counted number of events either globally for all groups, if the readout threshold is crossed for one group or if a predetermined number of groups has crossed the readout threshold, or locally for one group for which the readout threshold is crossed, and/or after a predetermined time interval.

12. The solid state imaging device according to claim 1, wherein readout thresholds for at least two of the groups differ, or all groups have the same readout threshold.

13. The solid state imaging device according to claim 1, wherein the control unit is configured to suspend event count for imaging pixels within configurable regions of the pixel array.

14. The solid state imaging device according to claim 1, wherein the control unit is configured to count the number of events by a counter or by a shift register.

15. A method for operating a solid state imaging device, the method comprising:

providing the solid state imaging device, including:

a pixel array that comprises a plurality of imaging pixels, each of which being capable to generate an imaging signal depending on the intensity of light falling on the imaging pixel and to detect as an event a positive or negative change of light intensity that is larger than a respective predetermined threshold;

the method further comprising:

counting the number of events occurring within at least one group among a plurality of groups of imaging pixels;

generating a flag representation comprising flags corresponding to the plurality of groups of imaging pixels, wherein the flags indicate which of the plurality of groups have a counted number of events that is larger than or equal to a predetermined readout threshold; and reading out the imaging signals of the imaging pixels within the groups indicated by the flag representation.

16. A solid state imaging device, comprising:

a pixel array comprising a plurality of imaging pixels, each of which being capable to generate an imaging signal depending on the intensity of light falling on the imaging pixel, and to detect as an event a positive or negative change of light intensity that is larger than a respective predetermined threshold; and a control unit that is configured to define a plurality of groups of imaging pixels within the pixel array;

to count the number of events occurring within at least one group among the plurality of groups of imaging pixels;

to generate a flag representation comprising flags corresponding to the plurality of groups of imaging pixels, wherein the flags identify specific groups for which the counted number of events exceeds a predetermined readout threshold; and to selectively read out the imaging signals of the specific groups identified by the flags of the flag representation.

17. The solid state imaging device according to claim 16, wherein the flag representation comprises a one-to-one map between positions of the groups in the pixel array and positions of the flags in the flag representation.

18. The solid state imaging device according to claim 16, wherein in reading out the imaging pixels of the groups that have crossed the readout threshold only the imaging pixels of these groups are read out.

19. The solid state imaging device according to claim 18, wherein all groups include the same number of imaging pixels; and all imaging signals of the imaging pixels of the groups that have crossed the readout threshold are arranged in readout lines having a constant length that is equal to the number of imaging pixels in each of the groups.

20. The solid state imaging device according to claim 16, wherein the control unit is configured to suspend event count for imaging pixels within configurable regions of the pixel array.

* * * * *